US012755330B2

(12) United States Patent
Mohseni et al.

(10) Patent No.: US 12,755,330 B2
(45) Date of Patent: Oct. 6, 2026

(54) SYSTEMS AND METHODS FOR PROCESSING USER PROFILE DATA STRUCTURES USING LANGUAGE MODEL OUTPUT

(71) Applicant: DK Crown Holdings Inc., Boston, MA (US)

(72) Inventors: Robin Mohseni, Billericay (GB); Gengyuan Zhang, Boston, MA (US); Gregory Von Pless, Melrose, MA (US)

(73) Assignee: DK Crown Holdings Inc., Boston, MA (US)

( * ) Notice: Subject to any disclaimer, the term of this patent is extended or adjusted under 35 U.S.C. 154(b) by 0 days.

(21) Appl. No.: 19/360,307

(22) Filed: Oct. 16, 2025

(65) Prior Publication Data

US 2026/0112240 A1 Apr. 23, 2026

Related U.S. Application Data

(60) Provisional application No. 63/741,671, filed on Jan. 3, 2025, provisional application No. 63/741,297, filed (Continued)

(51) Int. Cl.
*A63F 9/24* (2006.01)
*A63F 11/00* (2006.01)
(Continued)

(52) U.S. Cl.
CPC ............... *G06Q 50/34* (2013.01); *G06F 8/38* (2013.01); *G06F 16/22* (2019.01); (Continued)

(58) Field of Classification Search
CPC .. G07F 17/32; G07F 17/3201; G07F 17/3214; G07F 17/3222
(Continued)

(56) References Cited

U.S. PATENT DOCUMENTS

| | | | |
|---|---|---|---|
| 9,558,620 | B2 | 1/2017 | Froy et al. |
| 10,311,670 | B2 | 6/2019 | Brahmandam et al. |

(Continued)

FOREIGN PATENT DOCUMENTS

| | | | |
|---|---|---|---|
| CN | 116310582 | A | 6/2023 |
| WO | WO-2023/064563 | A1 | 4/2023 |

(Continued)

OTHER PUBLICATIONS

Cureton, et al., "Federated learning for intent classification." In 2023 IEEE 19th International Conference on Intelligent Computer Communication and Processing (ICCP), pp. 315-322. IEEE, 2023. (Year: 2023).

(Continued)

*Primary Examiner* — Adetokunbo O Torimiro
(74) *Attorney, Agent, or Firm* — Foley & Lardner LLP

(57) ABSTRACT

Described herein are interactive systems and methods for processing user profile data structures using language model output. The system can maintain data structures corresponding to events. The system can receive a prompt including a request. The system can generate, using a language model and the prompt, output identifying at least one data structure selected to satisfy the request. The system can receive a second prompt identifying a request to update a profile associated with a client device. The system can generate, using the language model and the second prompt, a command to update the profile based on the at least one data structure. The system can update the profile according to the command and the at least one data structure.

20 Claims, 8 Drawing Sheets

Related U.S. Application Data on Jan. 2, 2025, provisional application No. 63/719,406, filed on Nov. 12, 2024, provisional application No. 63/711,415, filed on Oct. 24, 2024, provisional application No. 63/708,509, filed on Oct. 17, 2024, provisional application No. 63/708,542, filed on Oct. 17, 2024, provisional application No. 63/708,554, filed on Oct. 17, 2024, provisional application No. 63/708,492, filed on Oct. 17, 2024, provisional application No. 63/708,528, filed on Oct. 17, 2024, provisional application No. 63/708,504, filed on Oct. 17, 2024.

(51) Int. Cl.

| | |
|---|---|
| ***G06F 8/38*** | (2018.01) |
| ***G06F 13/00*** | (2006.01) |
| ***G06F 16/22*** | (2019.01) |
| ***G06F 16/23*** | (2019.01) |
| ***G06F 16/3329*** | (2025.01) |
| ***G06F 16/338*** | (2019.01) |
| ***G06F 16/35*** | (2019.01) |
| ***G06F 16/9535*** | (2019.01) |
| ***G06F 17/00*** | (2019.01) |
| ***G06F 18/214*** | (2023.01) |
| ***G06F 40/279*** | (2020.01) |
| ***G06F 40/289*** | (2020.01) |
| ***G06F 40/295*** | (2020.01) |
| ***G06F 40/30*** | (2020.01) |
| ***G06N 3/0895*** | (2023.01) |
| ***G06N 20/00*** | (2019.01) |
| ***G06Q 50/34*** | (2012.01) |
| ***G07F 17/32*** | (2006.01) |
| ***H04L 51/02*** | (2022.01) |
| ***H04L 67/141*** | (2022.01) |
| ***H04L 67/306*** | (2022.01) |
| *G06F 40/284* | (2020.01) |
| *G06F 40/35* | (2020.01) |
| *G06F 40/40* | (2020.01) |

(52) U.S. Cl.

CPC ...... *G06F 16/2237* (2019.01); *G06F 16/2379* (2019.01); *G06F 16/3329* (2019.01); *G06F 16/33295* (2025.01); *G06F 16/338* (2019.01); *G06F 16/35* (2019.01); *G06F 16/9535* (2019.01); *G06F 18/214* (2023.01); *G06F 40/279* (2020.01); *G06F 40/289* (2020.01); *G06F 40/295* (2020.01); *G06F 40/30* (2020.01); *G06N 3/0895* (2023.01); *G06N 20/00* (2019.01); *G07F 17/323* (2013.01); *G07F 17/3237* (2013.01); *G07F 17/3244* (2013.01); *G07F 17/3288* (2013.01); *H04L 51/02* (2013.01); *H04L 67/141* (2013.01); *H04L 67/306* (2013.01); *G06F 40/284* (2020.01); *G06F 40/35* (2020.01); *G06F 40/40* (2020.01)

(58) Field of Classification Search

USPC ........................ 463/1, 10, 20, 22, 25, 30, 31

See application file for complete search history.

(56) References Cited

U.S. PATENT DOCUMENTS

| | | | |
|---|---|---|---|
| 10,825,303 | B2 | 11/2020 | Mcdonald et al. |
| 10,950,086 | B2 | 3/2021 | Brahmandam et al. |
| 11,094,171 | B2 | 8/2021 | Huke et al. |
| 11,704,000 | B1 | 7/2023 | Mcivor et al. |
| 11,735,006 | B2 * | 8/2023 | Nelson ................ G07F 17/3262 463/25 |
| 11,756,379 | B2 | 9/2023 | Huke et al. |
| 11,763,637 | B2 | 9/2023 | Huke et al. |
| 11,776,362 | B2 | 10/2023 | Nelson et al. |
| 11,785,280 | B1 | 10/2023 | Dakss et al. |
| 12,008,862 | B2 | 6/2024 | Inamdar et al. |
| 12,067,039 | B1 | 8/2024 | Campos et al. |
| 12,067,849 | B2 | 8/2024 | Storm et al. |
| 12,079,449 | B2 | 9/2024 | Mcivor et al. |
| 12,118,320 | B2 | 10/2024 | Gelfenbeyn et al. |
| 12,128,288 | B1 | 10/2024 | Redman et al. |
| 12,190,683 | B2 | 1/2025 | Huke et al. |
| 12,307,861 | B1 | 5/2025 | Todisco et al. |
| 12,322,246 | B2 | 6/2025 | Turner |
| 12,361,796 | B2 | 7/2025 | Joao |
| 12,444,266 | B2 | 10/2025 | Joao |
| 12,457,239 | B1 | 10/2025 | Mantin et al. |
| 12,477,036 | B1 | 11/2025 | Tenbuuren et al. |
| 2002/0068633 | A1 | 6/2002 | Schlaifer |
| 2008/0311981 | A1 | 12/2008 | Schugar et al. |
| 2010/0121808 | A1 | 5/2010 | Kuhn |
| 2010/0328066 | A1 | 12/2010 | Walker et al. |
| 2012/0034974 | A1 | 2/2012 | Amaitis et al. |
| 2012/0310926 | A1 | 12/2012 | Gannu et al. |
| 2013/0274007 | A1 | 10/2013 | Hilbert et al. |
| 2014/0024435 | A1 | 1/2014 | Scott |
| 2014/0289236 | A1 | 9/2014 | Agarwal et al. |
| 2015/0038236 | A1 | 2/2015 | Robbins et al. |
| 2015/0339884 | A1 | 11/2015 | Chun |
| 2016/0086441 | A1 | 3/2016 | Cohen et al. |
| 2016/0155350 | A1 | 6/2016 | Dragicevic et al. |
| 2016/0189483 | A1 | 6/2016 | Ballman |
| 2016/0196723 | A1 | 7/2016 | Ballman |
| 2018/0068661 | A1 | 3/2018 | Printz |
| 2018/0204417 | A1 | 7/2018 | Triplett |
| 2018/0225911 | A1 | 8/2018 | Washington et al. |
| 2019/0012876 | A1 | 1/2019 | Brahmandam et al. |
| 2019/0122482 | A1 | 4/2019 | Amaitis et al. |
| 2019/0318582 | A1 | 10/2019 | Barak |
| 2019/0325028 | A1 | 10/2019 | Palanichamy et al. |
| 2019/0361966 | A1 | 11/2019 | Munro et al. |
| 2019/0362601 | A1 | 11/2019 | Kline et al. |
| 2019/0392684 | A1 | 12/2019 | Mcdonald et al. |
| 2020/0027314 | A1 | 1/2020 | Pilnock et al. |
| 2020/0118040 | A1 | 4/2020 | Dey et al. |
| 2020/0234543 | A1 | 7/2020 | Schwartz et al. |
| 2021/0049490 | A1 | 2/2021 | Hood |
| 2021/0118264 | A1 | 4/2021 | Nelson et al. |
| 2021/0217277 | A1 | 7/2021 | Huke et al. |
| 2021/0217278 | A1 | 7/2021 | Huke et al. |
| 2021/0233344 | A1 | 7/2021 | Amaitis et al. |
| 2021/0248707 | A1 | 8/2021 | Huke et al. |
| 2021/0248875 | A1 | 8/2021 | Huke et al. |
| 2021/0256650 | A1 | 8/2021 | Huke et al. |
| 2021/0272415 | A1 | 9/2021 | Huke et al. |
| 2021/0280006 | A1 | 9/2021 | Pace |
| 2021/0299882 | A1 | 9/2021 | Cupersmith et al. |
| 2021/0319666 | A1 | 10/2021 | Salivar et al. |
| 2021/0319668 | A1 | 10/2021 | Huke et al. |
| 2021/0342550 | A1 | 11/2021 | Palanichamy et al. |
| 2021/0343122 | A1 | 11/2021 | Warren |
| 2021/0375090 | A1 | 12/2021 | Huke et al. |
| 2021/0383645 | A1 | 12/2021 | Gupta et al. |
| 2022/0019950 | A1 | 1/2022 | Sabri |
| 2022/0122601 | A1 | 4/2022 | Cronin |
| 2022/0139160 | A1 | 5/2022 | Huke et al. |
| 2022/0148364 | A1 | 5/2022 | Huke et al. |
| 2022/0148365 | A1 | 5/2022 | Huke et al. |
| 2022/0157114 | A1 | 5/2022 | Huke et al. |
| 2022/0165118 | A1 | 5/2022 | Huke et al. |
| 2022/0165120 | A1 | 5/2022 | Huke et al. |
| 2022/0172560 | A1 | 6/2022 | Huke et al. |
| 2022/0188366 | A1 | 6/2022 | Song et al. |
| 2022/0188672 | A1 | 6/2022 | Basch et al. |
| 2022/0189238 | A1 | 6/2022 | Huke et al. |
| 2022/0270432 | A1 * | 8/2022 | Mendell ............. G07F 17/3225 |
| 2022/0351568 | A1 | 11/2022 | Smith |
| 2022/0358808 | A1 | 11/2022 | Huke et al. |

(56) References Cited

U.S. PATENT DOCUMENTS

2022/0417603 A1 12/2022 Pleiman
2023/0011114 A1 1/2023 Guy et al.
2023/0082553 A1 3/2023 Mendell
2023/0124722 A1 4/2023 Polson et al.
2023/0162563 A1 5/2023 Turner
2023/0185579 A1 6/2023 Eranpurwala et al.
2023/0196871 A1* 6/2023 Inamdar .............. G07F 17/3237 463/25
2023/0252848 A1 8/2023 Isgar
2023/0259714 A1 8/2023 Lange
2023/0267805 A1* 8/2023 Edsall ................. G07F 17/3227 463/25
2023/0350928 A1 11/2023 Hill et al.
2023/0351845 A1 11/2023 Mendell et al.
2023/0360488 A1 11/2023 Alyekhin
2023/0360489 A1 11/2023 Alyekhin
2023/0360490 A1 11/2023 Alyekhin
2023/0360494 A1 11/2023 Alyekhin
2023/0394930 A1 12/2023 Shore et al.
2023/0410591 A1 12/2023 Monteverdi
2024/0029511 A1 1/2024 Teruuchi
2024/0086648 A1 3/2024 Han et al.
2024/0086773 A1 3/2024 Oppenheimer
2024/0105024 A1 3/2024 Huke et al.
2024/0282296 A1 8/2024 Bhathena et al.
2024/0290169 A1 8/2024 Inamdar et al.
2024/0312312 A1 9/2024 Flint
2024/0320510 A1 9/2024 Kundu et al.
2024/0346256 A1 10/2024 Qin
2024/0350924 A1 10/2024 Orlow
2024/0362409 A1 10/2024 Kuan
2024/0362968 A1 10/2024 Lyons et al.
2024/0362973 A1 10/2024 Owoyemi
2024/0367054 A1 11/2024 Nelson et al.
2024/0378251 A1 11/2024 Boyd
2024/0378940 A1 11/2024 Latifi et al.
2024/0403845 A1 12/2024 O'Hanlon et al.
2024/0412058 A1 12/2024 Mayande et al.
2024/0428700 A1 12/2024 Asgekar et al.
2025/0046150 A1 2/2025 Huke et al.
2025/0077913 A1 3/2025 Vodeniktov et al.
2025/0086190 A1 3/2025 Azarmi
2025/0094143 A1 3/2025 Huang
2025/0094708 A1 3/2025 Cunningham et al.
2025/0095438 A1 3/2025 Russ et al.
2025/0103624 A1 3/2025 Carta et al.
2025/0118151 A1 4/2025 Williams
2025/0118156 A1* 4/2025 Jovanovic ............... G06F 40/56
2025/0124063 A1 4/2025 Isslieb et al.
2025/0124340 A1 4/2025 Ni et al.
2025/0140075 A1 5/2025 Groset et al.
2025/0157284 A1 5/2025 Wolfe et al.
2025/0161811 A1 5/2025 Assaad et al.
2025/0174083 A1 5/2025 Huke et al.
2025/0191437 A1 6/2025 Hanson et al.
2025/0191440 A1 6/2025 Bradley et al.
2025/0209891 A1 6/2025 Jacquet et al.
2025/0232126 A1 7/2025 Ma et al.
2025/0238449 A1 7/2025 Sharma et al.
2025/0265310 A1 8/2025 Barnes
2025/0278633 A1 9/2025 Smith et al.
2025/0291866 A1 9/2025 Park et al.
2025/0294091 A1 9/2025 Mukherjee et al.
2025/0299053 A1 9/2025 Cuomo et al.
2025/0299536 A1 9/2025 Chun et al.
2025/0307302 A1 10/2025 Kolugur et al.
2025/0307572 A1 10/2025 Shtar et al.
2025/0307639 A1 10/2025 Jin et al.
2025/0316134 A1 10/2025 Vaccaro
2025/0316139 A1 10/2025 Vaccaro
2025/0316145 A1 10/2025 Merati
2025/0322092 A1 10/2025 Troiani et al.
2025/0322168 A1 10/2025 Sharma
2025/0322295 A1 10/2025 Brin et al.
2025/0329218 A1 10/2025 Russ et al.
2025/0348580 A1 11/2025 Galinkin
2025/0355929 A1 11/2025 Lara Silva et al.
2025/0356725 A1 11/2025 Nowak
2025/0363856 A1 11/2025 Turner et al.
2025/0371283 A1 12/2025 McCurdy et al.
2025/0391250 A1 12/2025 Todisco et al.
2026/0024524 A1 1/2026 Perkins et al.

FOREIGN PATENT DOCUMENTS

WO WO-2023/140642 A1 7/2023
WO WO-2024/194418 A1 9/2024
WO WO-2025/019764 A1 1/2025
WO WO-2025/042386 A1 2/2025

OTHER PUBLICATIONS

Final Office Action on U.S. Appl. No. 19/357,902 DTD Feb. 9, 2026.
Final Office Action on U.S. Appl. No. 19/358,959 DTD Feb. 5, 2026.
Final Office Action on U.S. Appl. No. 19/359,438 DTD Apr. 2, 2026.
Final Office Action on U.S. Appl. No. 19/359,531 DTD Mar. 25, 2026.
Final Office Action on U.S. Appl. No. 19/360,328 DTD Feb. 26, 2026.
Final Office Action on U.S. Appl. No. 19/360,383 DTD Feb. 3, 2026.
Lee, et al., "Sportify: Question Answering with Embedded Visualizations and Personified Narratives for Sports Video," in arXiv preprint arXiv:2408.05123 (2024). (Year: 2024).
Non-Final Office Action on U.S. Appl. No. 19/357,856 DTD Jan. 2, 2026.
Non-Final Office Action on U.S. Appl. No. 19/357,889 DTD Jan. 12, 2026.
Non-Final Office Action on U.S. Appl. No. 19/357,902 DTD Dec. 16, 2025.
Non-Final Office Action on U.S. Appl. No. 19/357,918 DTD Jan. 13, 2026.
Non-Final Office Action on U.S. Appl. No. 19/357,967 DTD Jan. 28, 2026.
Non-Final Office Action on U.S. Appl. No. 19/358,916 DTD Jan. 28, 2026.
Non-Final Office Action on U.S. Appl. No. 19/358,919 DTD Dec. 23, 2025.
Non-Final Office Action on U.S. Appl. No. 19/358,959 DTD Dec. 2, 2025.
Non-Final Office Action on U.S. Appl. No. 19/359,002 DTD Jan. 13, 2026.
Non-Final Office Action on U.S. Appl. No. 19/359,036 DTD Jan. 13, 2026.
Non-Final Office Action on U.S. Appl. No. 19/359,438 DTD Dec. 19, 2025.
Non-Final Office Action on U.S. Appl. No. 19/359,531 DTD Dec. 12, 2025.
Non-Final Office Action on U.S. Appl. No. 19/359,534 DTD Dec. 11, 2025.
Non-Final Office Action on U.S. Appl. No. 19/360,020 DTD Jan. 14, 2026.
Non-Final Office Action on U.S. Appl. No. 19/360,328 DTD Dec. 11, 2025.
Non-Final Office Action on U.S. Appl. No. 19/360,368 DTD Jan. 28, 2026.
Non-Final Office Action on U.S. Appl. No. 19/360,383 DTD Dec. 15, 2025.
Non-Final Office Action on U.S. Appl. No. 19/360,405 DTD Jan. 5, 2026.
Non-Final Office Action on U.S. Appl. No. 19/360,512 DTD Dec. 30, 2025.
Non-Final Office Action on U.S. Appl. No. 19/360,597 DTD Jan. 30, 2026.

(56) References Cited

OTHER PUBLICATIONS

Non-Final Office Action on U.S. Appl. No. 19/360,809 DTD Jan. 14, 2026.
Non-Final Office Action on U.S. Appl. No. 19/360,880 DTD Dec. 31, 2025.
Non-Final Office Action on U.S. Appl. No. 19/360,886 DTD Feb. 19, 2026.
Non-Final Office Action on U.S. Appl. No. 19/360,886 DTD Dec. 8, 2025.
Non-Final Office Action on U.S. Appl. No. 19/360,892 DTD Jan. 13, 2026.
Notice of Allowance on U.S. Appl. No. 19/359,534 DTD Feb. 11, 2026.
Notice of Allowance on U.S. Appl. No. 19/360,383 DTD Apr. 17, 2026.
Notice of Allowance on U.S. Appl. No. 19/360,873 DTD Jan. 26, 2026.
Schick et al., "Toolformer: Language Models Can Teach Themselves to Use Tools", Feb. 9, 2023, arXiv.com, pp. 1-17 (Year: 2023).
Structure Guided Prompt: Instructing Large Language Model in Multi-Step Reasoning by Exploring Graph Structure of the Text (Year: 2024).
Final Office Action on U.S. Appl. No. 19/357,856 DTD Apr. 21, 2026.
Final Office Action on U.S. Appl. No. 19/357,889 DTD Apr. 29, 2026.
Final Office Action on U.S. Appl. No. 19/358,919 DTD Apr. 21, 2026.
Final Office Action on U.S. Appl. No. 19/360,512 DTD Apr. 22, 2026.
Final Office Action on U.S. Appl. No. 19/360,597 DTD Jun. 5, 2026.
Final Office Action on U.S. Appl. No. 19/360,809 DTD May 1, 2026.
Final Office Action on U.S. Appl. No. 19/360,880 DTD Apr. 29, 2026.
Final Office Action on U.S. Appl. No. 19/360,892 DTD May 8, 2026.
Mohsenimofidi S, Prasad AS, Zahid A, Ra?q U, Wang X, Attal MI. Classifying user intent for effective prompt engineering: A case of a chatbot for startup teams. InGenerative Al for Effective Software Development Jun. 1, 2024 (pp. 317-329). Cham: Springer Nature Switzeriand. (Year: 2024).
Non-Final Office Action on U.S. Appl. No. 19/357,902 DTD Jul. 15, 2026.
Non-Final Office Action on U.S. Appl. No. 19/359,036 DTD May 11, 2026.
Non-Final Office Action on U.S. Appl. No. 19/359,948 DTD Jun. 17, 2026.
Non-Final Office Action on U.S. Appl. No. 19/360,030 DTD May 7, 2026.
Notice of Allowance on U.S. Appl. No. 19/358,916 DTD May 13, 2026.
Notice of Allowance on U.S. Appl. No. 19/358,959 DTD Jun. 26, 2026.
Notice of Allowance on U.S. Appl. No. 19/360,020 DTD Jun. 16, 2026.
Notice of Allowance on U.S. Appl. No. 19/360,405 DTD Apr. 24, 2026.
Final Office Action on U.S. Appl. No. 19/357,918 DTD Jul. 29, 2026.
Final Office Action on U.S. Appl. No. 19/357,967 DTD Aug. 13, 2026.
Non-Final Office Action on U.S. Appl. No. 19/359,531 DTD Aug. 11, 2026.
Notice of Allowance on U.S. Appl. No. 19/358,919 DTD Aug. 12, 2026.
Notice of Allowance on U.S. Appl. No. 19/360,512 DTD Aug. 17, 2026.

* cited by examiner

SYSTEMS AND METHODS FOR PROCESSING USER PROFILE DATA STRUCTURES USING LANGUAGE MODEL OUTPUT

CROSS-REFERENCES TO RELATED APPLICATIONS

This application claims the benefit of and priority to U.S. Provisional Patent Application No. 63/741,297, filed Jan. 2, 2025; and claims the benefit of and priority to U.S. Provisional Patent Application No. 63/708,509, filed Oct. 17, 2024; and claims the benefit of and priority to U.S. Provisional Patent Application No. 63/708,492, filed Oct. 17, 2024; and claims the benefit of and priority to U.S. Provisional Patent Application No. 63/708,528, filed Oct. 17, 2024; and claims the benefit of and priority to U.S. Provisional Patent Application No. 63/708,542, filed Oct. 17, 2024; and claims the benefit of and priority to U.S. Provisional Patent Application No. 63/708,504, filed Oct. 17, 2024; and claims the benefit of and priority to U.S. Provisional Patent Application No. 63/711,415, filed Oct. 24, 2024; and claims the benefit of and priority to U.S. Provisional Patent Application No. 63/708,554, filed Oct. 17, 2024; and claims the benefit of and priority to U.S. Provisional Patent Application No. 63/719,406, filed Nov. 12, 2024; and claims the benefit of and priority to U.S. Provisional Patent Application No. 63/741,671, filed Jan. 3, 2025; the contents of each of which are incorporated herein by reference in their entireties for all purposes.

BACKGROUND

Network environments can support communication between multiple computing devices using techniques such as packet-switching. Data transmitted between devices can be synchronized such that multiple devices on the same network access the same information. However, it can be challenging to efficiently synchronize data transmission for graphical elements using conventional networking technology.

SUMMARY

At least one aspect of the present disclosure is directed to a system. The interactive system can include one or more processors coupled to memory. The one or more processors may maintain a plurality of wager opportunities corresponding to a plurality of live events. The one or more processors may receive, from a client device, a prompt including a request for a wager recommendation. The one or more processors may generate, using a language model and the prompt, output identifying at least one wager opportunity of the plurality of wager opportunities selected to satisfy the request. The one or more processors may receive, from the client device, a second prompt identifying a request to update a player profile associated with the client device. The one or more processors may generate, using the language model and the second prompt, a command to update a data structure of the player profile based on the at least one wager opportunity. The one or more processors may update the data structure of the player profile according to the command and the at least one wager opportunity.

In some implementations, the second prompt can include a request to add a wager corresponding to the at least one wager opportunity to the data structure. In some implementations, the second prompt can include a wager amount corresponding to the wager. In some implementations, the one or more processors may update the data structure of the player profile according to the command to include the wager amount for the wager. In some implementations, the data structure of the player profile can store a second wager. In some implementations, the one or more processors may receive, from the client device, a third prompt identifying a request to modify the second wager stored in the data structure. In some implementations, the one or more processors may generate, using the language model and the prompt, a second command to modify the second wager. In some implementations, the one or more processors may update the data structure of the player profile according to the second command. In some implementations, the third prompt can identify a change to an amount of the second wager. In some implementations, the second wager can be a parlay wager, and the third prompt can identify a request to remove a leg of the parlay wager.

In some implementations, the data structure can include a plurality of wagers. In some implementations, the one or more processors may receive, from the client device, a third prompt identifying a request to remove at least one wager of the plurality of wagers. In some implementations, the one or more processors may generate, using the language model and the prompt, a second command to update the data structure according to the third prompt. In some implementations, the one or more processors may update the data structure of the player profile according to the second command to remove the at least one wager. In some implementations, the one or more processors may provide a notification including an interactive element that, when interacted with, causes the data structure to be updated. In some implementations, the one or more processors may, responsive to receiving an indication of an interaction with the interactive element, update the data structure of the player profile according to the second command to remove the at least one wager.

In some implementations, the one or more processors may provide, to the client device, a notification indicating that the data structure of the player profile has been updated. In some implementations, the one or more processors may receive, from the client device, a request to place one or more wagers indicated in the data structure. In some implementations, the one or more processors may generate a signal to execute the one or more wagers indicated in the data structure.

At least one aspect of the present disclosure is directed to a method of an interactive system. The method may include maintaining a plurality of wager opportunities corresponding to a plurality of live events. The method may include receiving, from a client device, a prompt including a request for a wager recommendation. The method may include generating, using a language model and the prompt, output identifying at least one wager opportunity of the plurality of wager opportunities selected to satisfy the request. The method may include receiving, from the client device, a second prompt identifying a request to update a player profile associated with the client device. The method may include generating, using the language model and the second prompt, a command to update a data structure of the player profile based on the at least one wager opportunity. The method may include updating the data structure of the player profile according to the command and the at least one wager opportunity.

In some implementations, the second prompt can include a request to add a wager corresponding to the at least one wager opportunity to the data structure. In some implementations, the second prompt can include a wager amount corresponding to the wager. In some implementations, the method may include updating the data structure of the player profile according to the command to include the wager amount for the wager.

In some implementations, the data structure of the player profile can store a second wager. In some implementations, the method may include receiving, from the client device, a third prompt identifying a request to modify the second wager stored in the data structure. In some implementations, the method may include generating, using the language model and the prompt, a second command to modify the second wager. In some implementations, the method may include updating the data structure of the player profile according to the second command. In some implementations, the third prompt can identify a change to an amount of the second wager. In some implementations, the second wager can be a parlay wager. In some implementations, the third prompt can identify a request to remove a leg of the parlay wager.

In some implementations, the data structure can include a plurality of wagers. In some implementations, the method may include receiving, from the client device, a third prompt identifying a request to remove at least one wager of the plurality of wagers. In some implementations, the method may include generating, using the language model and the prompt, a second command to update the data structure according to the third prompt. In some implementations, the method may include updating the data structure of the player profile according to the second command to remove the at least one wager. In some implementations, the method may include providing a notification including an interactive element that, when interacted with, causes the data structure to be updated. In some implementations, responsive to receiving an indication of an interaction with the interactive element, the method may include updating the data structure of the player profile according to the second command to remove the at least one wager.

In some implementations, the method may include providing, to the client device, a notification indicating that the data structure of the player profile has been updated. In some implementations, the method may include receiving, from the client device, a request to place one or more wagers indicated in the data structure. In some implementations, the method may include generating a signal to execute the one or more wagers indicated in the data structure.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form. For example, by appropriate computer programs, which may be carried on appropriate carrier media (e.g., computer readable media), which may be tangible carrier media (e.g., disks) or intangible carrier media (e.g., communications signals). Aspects may also be implemented using suitable apparatuses, which may take the form of programmable computers running computer programs arranged to implement the aspect. As used in the specification and in the claims, the singular form of "a", "an", and "the" include plural referents unless the context clearly dictates otherwise.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1:
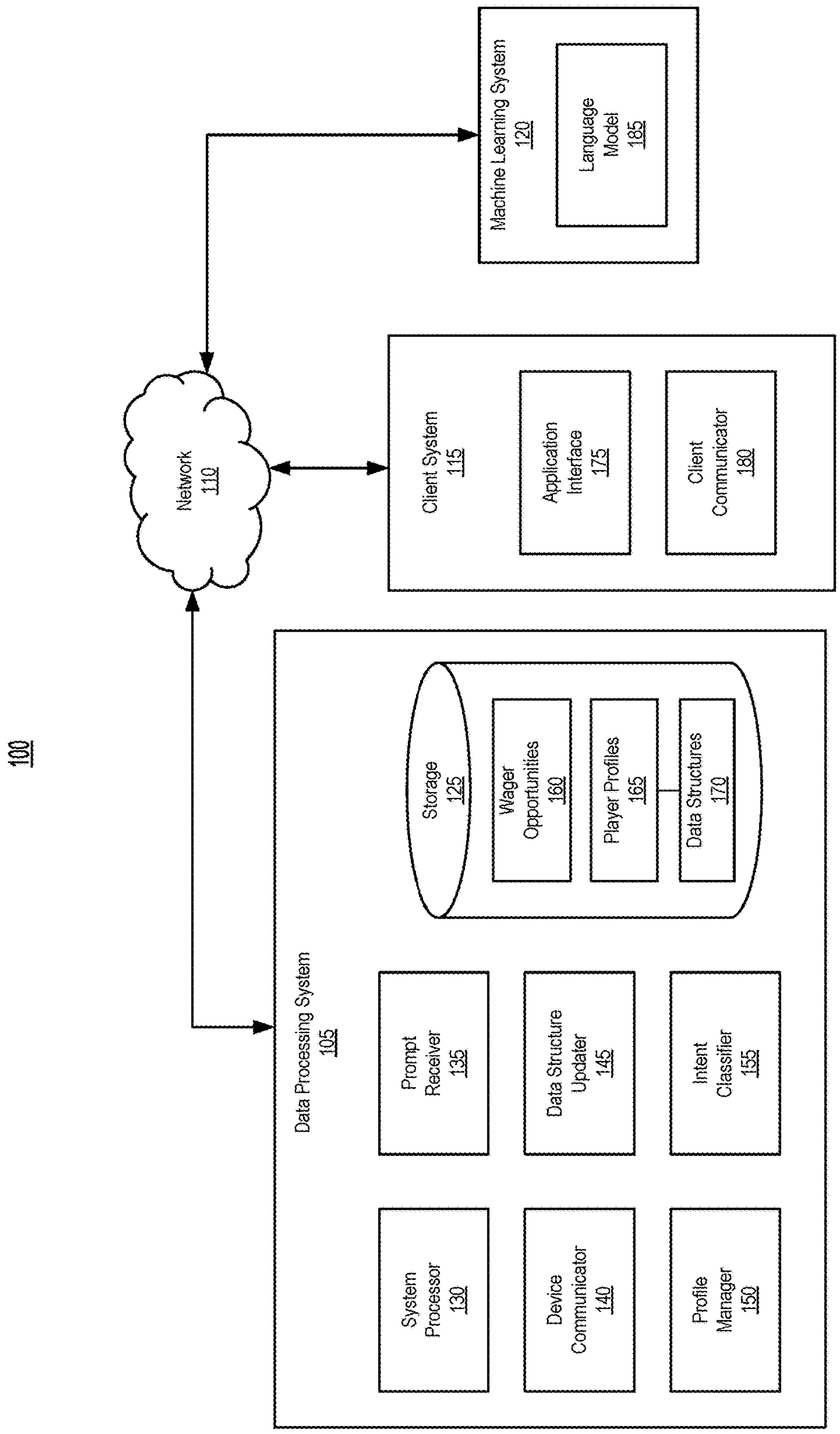
FIG. 1 illustrates a block diagram of an example system for processing user profile data structures using language model output, in accordance with one or more implementations.

Below are detailed descriptions of various concepts related to, and implementations of, techniques, approaches, methods, apparatuses, and systems for providing interactive game experiences. The various concepts introduced above and discussed in greater detail below may be implemented in any of numerous ways, as the described concepts are not limited to any particular manner of implementation. Examples of specific implementations and applications are provided primarily for illustrative purposes.

Natural language processing techniques can be applied across a wide range of computing environments to generate responses or other outputs based on natural language prompts. Language models and other machine-learning models can be used in various applications, including but not limited real-time information retrieval interfaces, which can be limited according to processing capacity of the systems executing such machine-learning models. To perform such operations, a language model can process input data sequences that represent prompts, contextual information, and other relevant data.

As language models typically include a large number of parameters, invoking such language models typically requires significant processing resources that make language models challenging to use for certain applications (e.g., real-time or near real-time applications. The number of operations and the amount of memory used to process a prompt is generally influenced by the size of the input context provided to the language model. Input contexts can include historical exchanges, metadata, and/or external reference information that may be relevant to generating an accurate or contextually suitable output. Generating suitable outputs typically involves providing large amounts of information as input to language models, which can significantly hinder performance, both in terms of accuracy and execution performance (e.g., computing resource utilization).

Conventional techniques for supplying input contexts to language models fail to ameliorate these issues. For example, conventional approaches often require sending large contexts, which often include an entire accumulated input, across multiple requests to achieve a requested output. Increasing the size of the input context results in increased network latency and bandwidth consumption. During output generation, executing language models with large input contexts causes processor load and increased memory allocation that grow at rates that reduce the feasibility of using language model in many real-time or near real-time applications. As a result, existing systems experience limited throughput, excessive memory consumption, and elevated network resource usage.

The techniques described herein address these and other issues by generating targeted input contexts for a language model that include only data determined to be relevant to a given prompt. In general, the techniques can select prompt-specific subsets of available context data based on one or more classification processes and/or rule-based policies. By constructing an input context from only the selected subset, the techniques described herein can significantly reduce the processing resources needed to process the input context without omitting information that is pertinent to generating an accurate output. Such context selection operations can be perform in connection with session-based data persistence, such that follow-on prompts can be processed according to previously stored interaction data, in some implementations.

By selectively reducing the contents of an input context based on prompt relevance and by avoiding redundant transmission of static context data, the techniques described herein can lower processing time and memory requirements for language model execution. Network bandwidth consumption can also be reduced because only incremental or newly relevant data is transmitted for follow-on prompts, rather than the entire accumulated context. These improvements can provide faster response times for multi-turn interactions, sustain throughput in high-load scenarios, and enable the use of large-scale language models within low-latency applications where conventional approaches would exceed performance constraints.

In further detail, various implementations of the systems and methods described herein can be used to reduce processor utilization and memory consumption when processing prompts with additional contextual input via one or more language models or other machine-learning models. For example, a system can maintain one or more data structures storing specific information that can be automatically selected for inclusion in an input context of the language/machine-learning models. As noted above, the computing resources (e.g., computing time and/or memory/caching consumption) used to execute language models or other natural language processing functions on computers increase at least quadratically with the size of the input context (e.g., the input data to be processed). Executing language models using existing techniques therefore restricts the context size according to the expected/target processing time of a corresponding request. For real-time or near real-time applications, such extended delays make using language models impossible to use.

In various implementations, the systems and methods described can dynamically generate data structures using language model output. As noted above, existing systems fail to execute language models in certain applications, and often consume excessive computing and network resources when executing prompts. For example, conventional approaches fail to accurately and efficiently update profile information using the output of language models because traditional approaches to using language model output fail to produce consistent and accurate results in a computationally efficient manner.

To address these challenges, the systems and methods described herein can dynamically generate an input context that includes a subset of data that can be used to carry out requested computing operations. Such automatic selection may be performed, for example, according to intent classification operations executed using additional machine-learning models and/or specific rules-based selection policies. By automatically selecting certain data to be included in the input context, the systems and methods described herein automatically limit the input context for the language model to a targeted subset of available data, thereby reducing the latency (e.g., processing time) and memory allocation required to carry out the requested operations using the language model. As a result, the systems and methods described herein operate more efficiently, and allow for the use of language models in real-time or near real-time processing applications, which would otherwise be impossible to implement using existing techniques.

Referring to FIG. 1, depicted is a block diagram of an example system 100 for processing user profile data structures using language model output. In FIG. 1, the system 100 can include at least one data processing system 105, at least one network 110, at least one client system 115 (sometimes referred to herein as a "client device 115"), and at least one machine learning system 120. In FIG. 1, the data processing system 105 can include at least one storage 125, at least one system processor 130, at least one prompt receiver 135, at least one device communicator 140, at least one data structure updater 145, at least one profile manager 150, and at least one intent classifier 155. The storage 125 can include one or more wager opportunities 160, one or more player profiles 165, and one or more data structures 170. The client system 115 can include at least one application interface 175 and at least one client communicator 180. The machine learning system 120 can include at least one language model 185.

The data processing system 105 can include a physical computer system operatively coupled or couplable with one or more components of the system 100. The data processing system 105 can include a cloud system, a server, a distributed remote system, or any combination thereof. The data processing system 105 can include a virtual computing system, an operating system, and a communication bus to effect communication and processing. The data processing system 105 can include physical infrastructure, such as physical servers, storage devices, and network equipment housed in data centers. The data processing system 105 can include a virtual computing system, which can include cloud-based virtual machines or containers for running applications and services. The data processing system 105 can include an operating system that can function as the core manager, allocating resources, configuring processes, and maintaining seamless interaction between hardware and applications. The data processing system 105 can include a communication bus that can facilitate communication between different components within the system. The data processing system 105 can connect with external systems to allow for data exchange and service delivery to end users.

The client system 115 can include a computing system that can be used to access the functionality of the data processing system 105. The client system 115 can include a smart phone, mobile device, laptop computer, desktop computer, one or more servers, or any other type of computing device. The client system 115 can include at least one processor and a memory, e.g., a processing circuit. The memory can store processor-executable instructions that, when executed by the processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language.

The client system 115 can include one or more devices to receive input from a user and/or to provide output to a user. For example, the output capabilities of the application interface 175 can be presented by a display device that provides visual feedback to the user. The display device can enhance the user experience with electronic displays, such as liquid crystal displays (LCD), light-emitting diode (LED) displays, or organic light-emitting diode (OLED) displays. The electronic displays can implement interactive features, including capacitive or resistive touch input, allowing for multi-touch functionality. The input functionalities can include a keyboard, mouse, or an integrated touch-sensitive panel on the display device, but are not limited thereto.

The machine learning system 120 can include one or more machine learning models trained on datasets. The machine learning system 120 can include a cloud system, a server, a distributed remote system, or any combination thereof. The machine learning system 120 can include, but is not limited to, at least, a central processing unit (CPU), a graphics processing unit (GPU), a tensor processing unit (TPU), or the like. The machine learning system 120 can include a memory operable to store one or more instructions for operating components of the machine learning system 120 and operating components operably coupled to the machine learning system 120. For example, the instructions can include firmware, software, hardware, operating systems, or embedded operating systems, among others. The machine learning system 120 can be internal to the data processing system 105. The machine learning system 120 can exist external to the data processing system 105 and can be accessed via the network 110. In some implementations, the machine learning system 120 implement or otherwise provide access to one or more application programming interfaces (APIs), via which the data processing system 105 and/or the client system 115 can access the language model 185 or other functionality of the machine learning system 120.

The network 110 can include computer networks such as the Internet, local, wide, metro, or other area networks, intranets, satellite networks, other computer networks such as voice or data mobile phone communication networks, and combinations thereof. The data processing system 105 of the system 100 can establish a communication session via the network 110, for example, with the client systems 115 and/or the machine learning system 120. Establishing a communication session can refer to creating a temporary connection between two or more devices to exchange information. For example, this can include setting up a data exchange session between the client system 115 and the data processing system 105. The network 110 may be any form of computer network that can relay information between the data processing system 105, the client system 115, the machine learning system 120, and one or more information sources, such as web servers or external databases, amongst others. The network 110 can include the Internet and/or other types of data networks, such as a local area network (LAN), a wide area network (WAN), a cellular network, a satellite network, or other types of data networks. The network 110 can include any number of computing devices (e.g., computers, servers, routers, network switches, etc.) that are configured to receive and/or transmit data within the network 110. The network 110 can further include any number of hardwired and/or wireless connections. Any or all of the computing devices described herein (e.g., the data processing system 105, the client system 115, the machine learning system 120, etc.) can communicate wirelessly (e.g., via Wi-Fi, cellular, radio, etc.) with a transceiver that is hardwired (e.g., via a fiber optic cable, a CAT5 cable, etc.) to other computing devices in the network 110. Any or all of the computing devices described herein can communicate wirelessly with the computing devices of the network 110 via a proxy device (e.g., a router, network switch, or gateway).

The data processing system 105 is shown as including the storage 125. The storage 125 can be a computer-readable memory that can store or maintain any of the information described herein. The storage 125 can store data associated with the system 100. The storage 125 can include one or more hardware memory devices to store binary data, digital data, or the like. The storage 125 can include one or more electrical components, electronic components, programmable electronic components, reprogrammable electronic components, integrated circuits, semiconductor devices, flip flops, arithmetic units, or the like. The storage 125 can include at least one of a non-volatile memory device, a solid-state memory device, a flash memory device, or a NAND memory device. The storage 125 can include one or more addressable memory regions disposed on one or more physical memory arrays. A physical memory array can include a NAND gate array disposed on, for example, at least one of a particular semiconductor device, an integrated circuit device, or a printed circuit board device. In an aspect, the storage 125 can correspond to a non-transitory computer readable medium. In an aspect, the non-transitory computer readable medium can include one or more instructions executable by the system processor 130.

In some implementations, the storage 125 can store, modify, or otherwise maintain any of the information described herein using one or more databases. The storage 125 can be accessed using one or more memory addresses, index values, or identifiers of any item, structure, or region maintained in the storage 125. The storage 125 can be accessed by the components of the data processing system 105, the client system 115, the machine learning system 120, or any other computing device described herein, via the network 110. The storage 125 can be internal to the data processing system 105. The storage 125 can exist externally to the data processing system 105 and can be accessed via the network 110. For example, the storage 125 can be distributed across many different computer systems (e.g., a cloud computing system) or storage elements and may be accessed via the network 110 or a suitable computer bus interface.

The data processing system 105, the client system 115, or the machine learning system 120 can store in the storage 125 the results of any or all computations, determinations, selections, identifications, generations, constructions, or calculations in one or more data structures indexed or identified with appropriate values. Any or all values stored in the storage 125 can be accessed by any computing device described herein, such as the data processing system 105, the client system 115, or the machine learning system 120, to perform any of the functionalities or functions described herein. In implementations where the storage 125 forms a part of a cloud computing system, the storage 125 can be a distributed storage medium in a cloud computing system and can be accessed by any of the components of the data processing system 105, the client system 115, the machine learning system 120, or by any other computing devices described herein.

The storage 125 can store wager opportunities 160 for one or more live events. The wager opportunities 160 can include event information, identifying the specific live event each wager is tied to, such as team names, game details, etc. The wager opportunities 160 can include wager options, including different types of bets available for each event, such as moneyline, point spread, or over/under, among other markets. The wager opportunities 160 can include odds, for example, the payout ratio associated with each wager and how much a winning wager would return. The wager opportunities 160 can include an indication of a live event. The live event can function as an identifier or reference, pointing to a specific ongoing live event from the available selections. The wager opportunities 160 can include an indication of a parlay or a single bet recommendation. For example, the wager opportunities 160 can include flags or markers indicating whether a wager is a parlay or a single bet. The wager opportunities 160 can include a record of the number of wagers placed. The wager opportunities 160 can include data corresponding to historical wager opportunities (e.g., past wagers) used to calculate or adjust the odds associated with the current wager opportunities.

In some implementations, odds associated with wager opportunities 160 can be dynamically adjusted based on various factors, such as live event data/developments, fluctuations in betting volume, and historical wager patterns, among others. In some implementations, upon detecting significant events, such as scores, timeouts, updates to bet slips, wagers added or removed, or legs added or removed, the data processing system 105 can recalculate and adjust wager odds. In some implementations, the data processing system 105 can track the popularity of specific wager types or specific wager opportunities, such as single game parlays, quick single game parlays (Quick SGPs), by tracking the number of times the corresponding wager types/opportunities have been selected. For example, each wager opportunity 160 can include or be associated with a counter that is incremented each time the wager opportunity is selected by a player via the data processing system 105. In some implementations, based on prompts and betting trends, the data processing system 105 can categorize or flag wager opportunities 160 as components or legs of parlay wagers.

The storage 125 can store one or more player profiles 165 associated with a user (sometimes referred to herein as a "player") of a client system 115. A player profile 165 of a player can be a user profile that includes information about the player and information about one or more of the client systems 115 used to access the data processing system 105 using the player profile 165. For example, identifiers of the player profile 165 can be used to access the functionality of the data processing system 105 (e.g., by logging into the data processing system 105 via one or more web-based interfaces). The identifiers can include a username, a password, an e-mail address, a phone number, a personal identification number (PIN), a secret code-word, and device identifiers for use in a two-factor authentication technique, among others. The player profile 165 can store information about wagers, games, and live events that are performed by the player via the data processing system 105.

The player profile 165 can store a credit balance, wager information or side wager information (e.g., an amount of a wager/side wager, a timestamp associated with a wager/side wager, information about gaming conditions or game state information that resulted in a side wager, a client system identifier of the client system 115 that was used to place the wager/side wager, etc.). The player profile 165 can store information about the client system 115 used to access the data processing system 105, such as an IP address, a MAC address, a GUID, a player profile name (e.g., the name of a user of the client system, etc.), and device name, among others. In some implementations, the player profile 165 can be generated by the data processing system 105 in response to the player profile generation request transmitted by the client system 115 associated with a client device. The player profile generation request can include any of the player profile information described herein.

The storage 125 can store/maintain a data structure 170 associated with each of the one or more player profiles 165. The data structure 170 can be used to track and manage wagers that are enqueued to be placed by a player. The data structure 170 may correspond to a "bet slip,". The data structure 170 can store information about wagers placed by the player, including, but not limited to, selections (e.g., specific bets being made, such as which team will win), odds (e.g., the probability of each selection winning, which determines the potential payout), the stake (e.g., the amount of money being wagered), and the total payout (e.g., the amount the player stands to win if the bet is successful). Each wager can be identified by a reference number (e.g., an identifier for tracking the wager). In some implementations, the data structures can include wager status (whether the wager is pending, settled, or voided). In some implementations, the data structure 170 can also include a timestamp (e.g., the time the wager was placed) and the wager type (e.g., single, parlay, etc.). In some implementations, the data structures 170 can store containers (e.g., arrays, lists, dictionaries), indices, or otherwise store each of the values, pluralities, sets, variables, vectors, numbers, or thresholds described herein. For example, the data structures 170 can store various types of data, including textual data (e.g., player name, wager description, communication logs), numeric data (e.g., wager amount, odds, payout, timestamp), structured data (e.g., wager type (single, parlay, etc.), wager status (pending, settled, voided), bet selections), and other data types (e.g., custom fields for specific game type), among others.

In some implementations, the data structure 170 can be used to store information related to communication sessions between the player and the language model 185. For example, the data structure 170 can include, but is not limited to, prompt history (e.g., a record of prompts or questions submitted by the player to the language model), response history (e.g., a record of the language model's responses to the prompts), session timestamps (e.g., the start and end times of each communication session), session summary (e.g., a brief overview of the topics discussed during the session), and sentiment analysis (e.g., metrics indicating the overall sentiment or tone of the conversation, such as positive, negative, or neutral).

In some implementations, the data structure 170 can provide real-time or near real-time access to and modification of wager information. The data structure 170 can facilitate the prompt retrieval and update of wager data without significant delays or latency. The data structure 170 can store wager data in a structured format to facilitate efficient querying and updates. In some implementations, the data structure 170 can implement key-value pairs, which can manage large volumes of data or complex data relationships. In some implementations, the data structure 170 can store additional metadata corresponding to wager opportunities added to the player's bet slip, including but not limited to a timestamp, expiration information for the wager, minimum wager amount data, or odds data at the time the wager opportunity was added to the data structure 170, among other information. The data processing system 105 can periodically access the data structure 170 to identify wager opportunities 160 whose expiration timestamp has been reached. When an expired wager is identified, the data processing system 105 can remove the specific wager from the data structure 170 automatically, in some implementations, or otherwise provide an indication to a client system 115.

In some implementations, the data structure 170 can store information for games previously or currently played or otherwise accessed by the client system 115 using a corresponding player profile 165. The data structure 170 associated with the player profile 165 can store personal details such as name, age, gender, and other details. The data structure 170 can store game statistics such as scores, levels achieved, time spent playing, and other performance metrics. In some implementations, behavioral data may be recorded within the data structure 170, capturing patterns of play, preferred game modes, and in-game actions. In some implementations, the data structures 170 can store game rewards, such as badges, trophies, and milestones. In some implementations, the data structure 170 can store information regarding social interactions, including friends, team memberships, and communication logs, among others. In some implementations, personal preferences, such as customizations, favorite characters, and settings, can be stored within the data structure 170. In some implementations, the data structure 170 can store information such as details of previous wagers, side wagers, actions, interactions, or other data provided by the client system 115 during the play of a game provided by the data processing system 105.

The data processing system 105 can include the system processor 130. The system processor 130 can execute one or more instructions associated with the data processing system 105. The system processor 130 can include an electronic processor, an integrated circuit, or the like, including one or more of digital logic, analog logic, digital sensors, analog sensors, communication buses, volatile memory, nonvolatile memory, and the like. The system processor 130 can include, but is not limited to, at least one central processing unit (CPU), graphics processing unit (GPU), physics processing unit (PPU), tensor processing unit (TPU), embedded controller (EC), or the like. The system processor 130 can include a memory operable to store or storing one or more instructions for operating components of the system processor 130 and operating components operably coupled to the system processor 130. For example, the one or more instructions can include one or more of firmware, software, hardware, operating systems, or embedded operating systems. The system processor 130 or the data processing system 105 can include one or more communication bus controllers to effect communication between the system processor 130 and the other elements of the data processing system 105.

The data processing system 105 can include the prompt receiver 135. The prompt receiver 135 can be or include any script, file, program, application, set of instructions, or computer-executable code that is configured to process input data in the form of a prompt. The prompt receiver 135 can include hardware, software, or any combination thereof. A prompt can include any user-provided command, request, or text data. The prompt can include a request or information relating to bet placement, such as an indication of a wager type, a wager amount, or selecting specific live events or outcomes. The prompt receiver 135 can receive the prompt from the client system 115 in natural language (e.g., a text string). The prompt receiver 135 can receive prompts through user interactions with the application interface 175. User interactions can include clicking buttons, entering text, or using voice commands within one or more application interfaces 175, among others. In some implementations, the prompt receiver 135 can expose an API endpoint, allowing other applications or systems to send prompts in structured formats such as JSON or XML. In some implementations, the prompt receiver 135 can subscribe to a message queue where prompts are published by other components/devices of the system 100, for example, according to a publisher-subscriber communication protocol. In some implementations, the prompt receiver 135 can identify specific events or triggers, such as user actions or system state changes, which can generate prompts. In some implementations, the prompt receiver 135 can process prompts loaded from files stored on the data processing system 105.

In some implementations, the prompt receiver 135 can parse and process the prompts to extract information, such as wager type, amount, and game selections, among others. The prompt receiver 135 can execute functions based on the prompt's content. In some implementations, the prompt receiver 135 can perform validation checks. For example, the prompt receiver 135 can validate the requested wager against current betting odds or predefined rules. The prompt receiver 135 can validate the sufficiency of the user's account balance via the profile manager 150. The prompt receiver 135 can validate the timing of the bet. The prompt receiver 135 can facilitate the transmission of the wager to the service provider's backend, where the wager is logged and acted upon. The prompt receiver 135 can format the wager information or the user's input into a standardized data structure for transmission to the backend for further processing, such as logging, risk assessment, and odds calculation, among others. The prompt receiver 135 can collect or store records of user prompts (and, in some implementations, conversation records including corresponding responses) in the storage 125 as part of one or more training datasets to improve the classification accuracy of the language model 185 over time, in some implementations.

The data processing system 105 can include the device communicator 140. The device communicator 140 can be or include any script, file, program, application, set of instructions, or computer-executable code that is configured to facilitate communication between the data processing system 105, the client system 115, and the machine learning system 120. The device communicator 140 can include hardware, software, or any combination. The device communicator 140 can facilitate communication between the data processing system 105, the network 110, the client system 115, and/or the machine learning system 120 via one or more communication interfaces. A communication interface can include, for example, an API compatible with components of the data processing system 105, the client system 115, or the machine learning system 120.

The device communicator 140 can support various communication protocols (TCP/IP, UDP) compatible with a particular component of the data processing system 105, a particular component of the client system 115, or a particular component of the machine learning system 120. The device communicator 140 can implement multiple communication interfaces, including web sockets or messaging protocols, to accommodate a range of client applications. The device communicator 140 can facilitate data transfer through techniques such as compression, encryption, and error correction, among others. The device communicator 140 can be compatible with diverse content items and can be compatible with particular content delivery systems corresponding to particular content items, structures of data, types of data, or any combination thereof. For example, the device communicator 140 can be compatible with the transmission of text data or binary data structured according to one or more metrics or data of the application interface 175 or the client system 115. The device communicator 140 can provide the client system 115 with instructions to display lists of interactive options, such as live events, content items, or wagering opportunities.

The data processing system 105 can include the data structure updater 145. The data structure updater 145 can be or include any script, file, program, application, set of instructions, or computer-executable code that is configured to update or modify the data structures 170 associated with the player profiles 165. The data structure updater 145 can include hardware, software, or any combination. The data structure updater 145 can receive commands from the language model 185, as described herein, validate the commands and perform updates to a data structure 170 of a corresponding player profile 165 according to the commands/instructions. In some implementations, the data structure updater 145 can insert additional wager details or data by adding additional information to the existing data structure 170 associated with a wager. For example, the data structure updater 145 can expand update wager opportunities 160 included in a data structure 170 of a player profile 165, for example by adding more additional wager opportunities 160 as legs to a constructed parlay wager opportunity 160 or including additional wager opportunities 160 in the data structure 170.

In some implementations, the data structure updater 145 can remove one or more of the existing legs from a parlay wager opportunity 160. In some implementations, the data structure updater 145 can track additional information, such as recording the time a wager was placed. For example, the data structure updater 145 can insert a time entry indicating an additional selection if a player wants to add another leg to their existing parlay. In some implementations, the data structure updater 145 can generate an additional entry in the data structure 170 and populate the corresponding data structure 170 with the relevant wager details when adding a new wager type, such as a moneyline or point spread, among others. In some implementations, the data structure updater 145 can add a timestamp field to the wager data structure and populate it with the current time.

In some implementations, the data structure updater 145 can update wager details by modifying existing wager information within the data structures 170. The data structure updater 145 can change or update wager parameters, such as altering the wager amount, wager type, or any other attribute of the wager. The data structure updater 145 can update wager status to indicates changes, for example, transitioning from pending to active, active to settled, or active to voided. The data structure updater 145 can adjust wager calculations, for example, by recalculating potential payouts, or performing other calculations based on changes to the wager. For example, if the commands/instructions received as output from the language model 185 include commands/instructions to increase or decrease their wager on a selection, the data structure updater 145 can modify the corresponding field to implement the updated amount. In some implementations, if the commands/instructions received as output from the language model 185 include commands/instructions to remove one or more legs from a wager opportunity 160 identified in the data structure 170, the data structure updater 145 can remove the specified leg(s) from the data structure 170 and recalculate the overall odds and/or potential payout. In some implementations, where a wager is settled, won, or lost, the data structure updater 145 can change the wager status to indicate the outcome or update the status if a wager is canceled or voided.

In some implementations, the data structure updater 145 can remove or delete specific wager information from the data structure 170 based on requests from the client system 115 and/or commands/instructions generated by the language model 185. The data structure updater 145 can cancel/remove a wager if or commands/instructions generated by the language model 185 include commands/instructions to cancel a pending wager before the wager is settled. In some implementations, the client system 115 and/or the commands/instructions generated by the language model 185 include commands/instructions to clear the data structure 170 of all unexecuted wager opportunities 160. In some implementations, the data structure updater 145 can identify the specific wager to be removed based on a provided wager identifier or other criteria, and the data structure updater 145 can remove the wager entry from the data structure 170, for example, by removing the corresponding wager entry or marking it as deleted while retaining the wager entry for historical purposes. In some implementations, the data structure updater 145 can update the related wager information, such as recalculating the overall parlay status and/or payout. In some implementations, the data structure updater 145 can implement undo functionality for players to reverse a deleted wager if the deletion was accidental. Such undo commands may be transmitted in a request from the client system 115 and/or received in commands/instructions generated by the language model 185.

In some implementations, the data structure updater 145 can rearrange or restructure the data within the data structures 170, for example, to make it easier for players to understand their wager history. In some implementations, the data structure updater 145 can facilitate the processing of wager data associated with the respective player profiles 165 by grouping wagers based on specific criteria. For example, the data structure updater 145 can sort wagers by date, time, wager amount, or other relevant criteria. In some implementations, the data structure updater 145 can group wagers by type, outcome, or other relevant categories. In some implementations, the data structure updater 145 can allow players to create custom filters or views, such as displaying only winning wagers or wagers placed on a particular sport. The sorting/arrangement/grouping may be reflected in how wager opportunities 160 (or attributes thereof) are stored in the data structure 170 of a player profile 165, and may be performed in response to commands/instructions generated by the language model 185.

In some implementations, the data structure updater 145 can generate a data structure 170 when the data structure 170 does not exist for a player profile 165. The data structure updater 145 can generate a data structure instance based on a predefined template or schema that defines the required fields and data types for storing wager information. The newly generated data structure 170 can be populated with initial values, including the player ID, which functions as an identifier for the player profile 165, and an empty list or array to store wager data (e.g., as a bet slip). In some implementations, other relevant fields can be initialized with default or null values. In some implementations, where a wager is being placed simultaneously with the generation of the data structure 170, the data structure updater 145 can add the wager details to the newly generated data structure 170.

In some implementations, the data structure updater 145 can receive commands/instructions from the language model 185 as a structured input, such as a JSON object or a custom format. Upon receiving the command, the data structure updater 145 can parse the command to extract the relevant information, including the command type, player ID, wager identifier, wager opportunity, wager amount, and any other specified details. The data structure updater 145 can validate the command or can identify any missing fields or invalid values. In some implementations, the data structure updater 145 can identify the player profile 165 by using the player ID to identify the corresponding player profile and retrieve the associated data structure 170. In some implementations, where a wager identifier is provided, the data structure updater 145 can use the wager identifier to identify the specific wager within the data structure 170. In some implementations, the data structure updater 145 can implement other criteria, such as the wager opportunity/recommendation or timestamp, to identify the specific wager associated with the player profile 165.

In some implementations, the data structure updater 145 can update the data structure 170 according to the instructions in the command, which may include changing the wager amount, removing a leg from a parlay, updating the wager status, or adding or removing selections, among others. In some implementations, the data structure updater 145 can recalculate the potential payout based on the changes made to the wager. In some implementations, the data structure updater 145 can initiate or update a wager count counter within the data structure 170 to track the number of wagers associated with the player profile 165. For instance, adding a wager can increment the counter, and removing a wager can decrement it.

The data processing system 105 can include the profile manager 150. The profile manager 150 can be or include any script, file, program, application, set of instructions, or computer-executable code that is configured to create, modify, delete, or otherwise manage player profiles 165 stored within the storage 125. The profile manager 150 can include hardware, software, or any combination. The profile manager 150 can store and organize player information, including account details, preferences, and gaming history, among others. The profile manager 150 can generate profile information based on data received from the client systems 115. This configuration can allow the profile manager 150 to capture activity across different interactive applications and different devices, and store records of that activity in the player profile 165. The profile manager 150 can update credit balances, game statistics, and other relevant information based on the outcomes of games played by the client system 115. The profile manager 150 can receive data about game results from the client system 115 and use this information to make adjustments to the player profile 165. The profile manager 150 can store game statistics such as the number of wins, losses, and ties, as well as the player's average bet size, win percentage, and longest winning streak, among others. In some implementations, the profile manager 150 can store records of player interactions, including prompts, responses, or conversation histories, with the language model 185.

The data processing system 105 can include the intent classifier 155. The intent classifier 155 can be or include any script, file, program, application, set of instructions, or computer-executable code that is configured to determine the classification of the request included in a user input, referred to as a prompt. The intent classifier can include hardware, software, or any combination. The intent classifier 155 can parse prompts received from the client system 115 to determine an intent of the prompts. For a given prompt, the data processing system 105 can use the intent classifier 155 to generate an input context for the language model 185 using the prompt and its classification. The input context can include a variety of information, such as prompts, questions, or previous parts of a conversation. The intent classifier 155 can identify the desired action or information sought by the user.

In some implementations, the intent classifier 155 can use rule-based techniques to identify user intents. For example, the intent classifier 155 can use a set of predefined rules or patterns that match specific prompts to predefined intents. In some implementations, the intent classifier 155 can use keyword matching or regular expressions to identify patterns that capture variations in prompts. For example, a rule can specify that a prompt related to placing a wager may indicate a betting intent. In some implementations, the intent classifier 155 can use machine learning models to identify a wider range of intents, including those that are context-dependent or ambiguous. For example, the intent classifier 155 can use implement vector machines (SVMs), naive bayes, or deep learning architectures such as recurrent neural networks (RNNs) and transformers (BERT). The models can be trained on large datasets of user prompts and their corresponding intents. The intent classifier 155 can use the machine learning model(s) to distinguish between user intents, such as checking odds, placing wagers, or requesting payouts, among other prompts. In some implementations, the intent classifier 155 can use the language model 185 to determine the intent of a prompt by transmitting the prompt with additional instructions, attributes, and/or contextual data to determine the intent.

The intent classifier 155 can process user prompts to extract the underlying intent or purpose. The intent classifier 155 can categorize the user's prompt into specific intents, such as placing a bet, checking odds, requesting information about a specific live event, team, or participant, or request to update a data structure 170 associated with the player profile 165. The intent classifier 155 can determine the actions to fulfill the user's request based on the classified intent. For example, if a user enters the prompt "What are the odds for Team A to win tonight?", the intent classifier 155 can determine that the prompt is a request for wagering information, identify the specific wager type as a moneyline bet, and extract relevant details such as the team's name (in this example, Team A) and the game timeframe (in this example, tonight).

In some implementations, upon receiving a prompt (e.g., a first prompt), the intent classifier 155 can process the input to identify the user's intent to, for example, by processing keywords, entities, or semantic meaning. In some implementations, where the intent classifier 155 cannot identify the application interface 175 based on the first prompt, the intent classifier 155 can provide an indication to the client system 115 that additional information is desired. The client system 115 can transmit a second prompt to the data processing system 105. The intent classifier 155 can process the first and second prompts to identify the intended application interface 175 or the user's intent. For example, if the first prompt reads "Odds for," and the second prompt reads "Team A baseball game tonight," the intent classifier 155 can determine that the user intends to access the current odds for tonight's baseball game for Team A.

In some implementations, based on the prompt or system-defined criteria, the intent classifier 155 can retrieve additional relevant wager opportunities 160 from the storage 125. In some implementations, the intent classifier 155 can retrieve additional wager opportunities 160 to combine with an existing wager (e.g., as an additional or alternative leg for a parlay wager), forming a parlay bet. For example, the intent classifier 155 can identify potential legs for the parlay based on available betting options. In some implementations, the intent classifier 155 or the prompt receiver 135, depending on the implementation, can process user requests for payout information. For example, upon receiving a prompt about wager winnings, the intent classifier 155, via the data processing system 105, can cause the language model 185 to generate a data structure that includes the details of the payout based on the wager's outcome and odds. In some implementations, where the intent classifier 155 receives updates (e.g., updated odds for a specific wager), the intent classifier 155 can search through the existing wager data in the storage 125 to find the corresponding wager based on identifiers (e.g., player ID, wager ID, etc.).

In some implementations, the data processing system 105, via the prompt receiver 135 or the intent classifier 155, can extract relevant keywords or metadata from the content items 175 to facilitate content discovery, for example, through search functionalities. When a user initiates a search via the application interface 175, the data processing system 105 can process the prompt and retrieve the relevant content item by matching keywords, embeddings, or other data extracted/generated from the prompt with corresponding keywords, embeddings, or other data stored with the content item. The intent classifier 155 can generate an input context for the language model 185. The data processing system 105 can transmit the input context to the language model 185, which can generate data structures corresponding to the content items.

The client system 115 can execute an application that communicates with the data processing system 105. The application can present one or more application interfaces 175. The application interface 175 can include a set of rules or protocols that allow different software programs or systems to communicate with each other. The application interface 175 can provide user interfaces to facilitate interaction. Users can input information, view content, or initiate actions through the application interface 175. In some implementations, the application interface 175 can be associated with a particular client application that communicates with the data processing system 105. The client application can include an application executing on each client system 115. The client application can include a web application, a server application, a resource, a desktop, or a file. In some implementations, the client application can include a local application (e.g., local to a client system 115), a hosted application, a software-as-a-service (SaaS) application, a virtual application, a mobile application, and other forms of content. In some implementations, the client application can include or correspond to applications provided by remote servers or third-party servers.

The application interface 175 can include graphical user interfaces or graphical elements that present content items, interaction modes, or wager recommendations. The application interface 175 can dynamically configure the graphical user interface based on the user's activities and preferences. The application interface 175 can receive interactions from the user, such as selections or specifications of wagers to be placed through the application interface 175. In response to receiving the interactions, the client application presenting the application interface 175 can communicate with the data processing system 105 to execute the placement of wagers. In some implementations, the application interface 175, via the client system 115, can cause the data processing system 105 to update the storage 125 to include the details of the wager counts. In some implementations, upon interaction with a graphical element, the application interface 175, via the data processing system 105, can cause the profile manager 150 to update a player profile 165 associated with the client system 115 according to the wager placed.

The client communicator 180 within the client system 115 can be similar to, and include any of the structure and functionality of, the device communicator 140 described in connection with the data processing system 105. For example, the client communicator 180 within the client system 115 can communicate with the data processing system 105 via the network 110 using one or more communication interfaces to carry out the various operations described herein. The client communicator 180 can be compatible with particular content objects and can be compatible with particular content delivery systems corresponding to particular content objects, structures of data, types of data, or any combination thereof.

The machine learning system 120 can include the language model 185. The language model 185 can be trained on text data. For instance, the language models 185 can be trained/updated/fine-tuned to perform a variety of text processing tasks, including, but not limited to, generating text, formatting instructions 165, comprehending and processing natural language input, and responding to queries with contextually relevant information. The language model 185 can include a transformer architecture, such as a generative pre-trained transformer (GPT) architecture. The transformer architecture can include an encoder that can process the input text and a decoder that can generate the output text. The language model 185 can include multiple layers that can operate to process and generate text. For example, embedding layers can convert words or tokens into dense vectors of fixed size, attention layers can use mechanisms such as self-attention to weigh the importance of different tokens in a sequence, and feedforward layers can apply transformations to the data to learn complex patterns. In some implementations, the language model 185 can use a self-attention mechanism to weight different parts of the input sequence when generating predictions. The language model 185 can be trained/fine-tuned/updated on vast datasets (e.g., one or more training datasets 180, etc.), for example, generated or updated by the model updater 145 using different learning techniques, as described herein. The language model 185 may be pre-trained using large corpuses of natural language text data, such that the language model 185 can efficiently process and provide output corresponding to natural language input.

Natural language input can have a syntactic structure in which individual words, collections of words (e.g., phrases), or relative positions of words (e.g., word order) can indicate specific meanings. The language model 185 can be trained/updated/fine-tuned to parse sentences into their grammatical components to understand the structure and relationships between words. The language model 185 can use phrasing structure rules that define how words combine to form phrases and sentences. The language model 185 can receive an input context, which can include a sequence of tokens and/or text data structured in a format compatible with an input layer of the language model 185. In some implementations, the language model 185 may include or may be associated with a tokenizer model, which can convert a text-based or media-based input context into a sequence of tokens compatible with an input layer of the language model 185. The input context may include natural language, structured data, or combinations thereof, and may specify instructions for the model to generate particular output (e.g., commands to modify one or more data structures 170, etc.) according to the techniques described herein.

The language model 185 can receive an input context generated via the intent classifier 155. As described herein, the input context can include relevant wager opportunities 160 identified based on the prompt. The data processing system 105 can transmit the input context to the language model 185. The machine learning system 120 can execute the language model 185 to process the input context. The language model 185 can generate an output data structure including one or more tokens representing an output message generated based on the input context. In some implementations, tokens or combinations of tokens can indicate special control data for the language model, including but not limited to the beginning/end of formatting instructions, the beginning of prompts/natural language text, or the beginning/end of wager opportunities, deep links, commands/function calls, or any other type of data described herein. In some implementations, one or more tokens may represent a command to invoke one or more functions to update or otherwise access one or more data structures 170 of a corresponding player profile.

The language model 185 can process a wide range of input formats, including but not limited to text, audio, images, video, or other modalities. In some implementations, based on the input context, the language model 185 can generate output, which can range from simple text responses to complex data structures (e.g., the formatting instructions 165), or combinations thereof. In some implementations, the language model 185 can use the input context to iteratively predict the next token word or phrase to generate responses in response to input contexts. Tokens may include a numerical representation of text data, function calls, special separators/control signals, or any other data described herein. In some implementations, the language model 185 can generate instructions or commands that automatically invoke tools or functions to perform specific tasks or operations.

In some implementations, the language model 185 can process prompts and extract relevant information to perform functions update a data structure 170 associated with a player profile 165, such as removing a wager, removing legs, or updating an existing wager, among others. In some implementations, the language model 185 can parse the prompt to extract relevant details, such as the player ID, wager identifier, wager opportunity, and other desired changes. Based on the extracted information, the language model 185 can generate a command for the data processing system 105 to update the data structure 170 associated with the player profile 165. In some implementations, the language model 185 can generate a command that includes a token, character, string, or phrase that functions as a signal or identifier for the data processing system 105. In some implementations, the language model 185 can implement a specific format or syntax for the generated command, such as JSON or a custom format. The generated command for the data processing system 105 can include an identifier indicating the type of action to be performed (e.g., update wager, etc.), the player ID (e.g., identifier for the player profile 165), the wager identifier (e.g., identifier for the specific wager being modified), the selected wager opportunity, the desired wager amount, and any other relevant details.

In some implementations, the data processing system 105 can directly execute the language model 185 as a component. The data processing system 105 can select the language model 185 based on factors, such as computational complexity, efficiency, and task-specific capabilities, among other attributes. The data processing system 105 can use data cleansing, tokenization, or other standardization techniques to maintain compatibility with the language model 185. In some implementations, the data processing system 105 can implement batch processing, data streaming, or asynchronous data management techniques to manage data flow into the language model 185. In some implementations, where the data processing system 105 is using an API to access the functionality of the language model 185, the data processing system 105 can integrate API calls into its operational workflow. In some implementations, where the data processing system 105 is deploying the language model 185 on local infrastructure, the data processing system 105 can load the language model 185 into system memory. The data processing system 105 can format incoming data to match the input structure of the language model 185.

Figure 2:
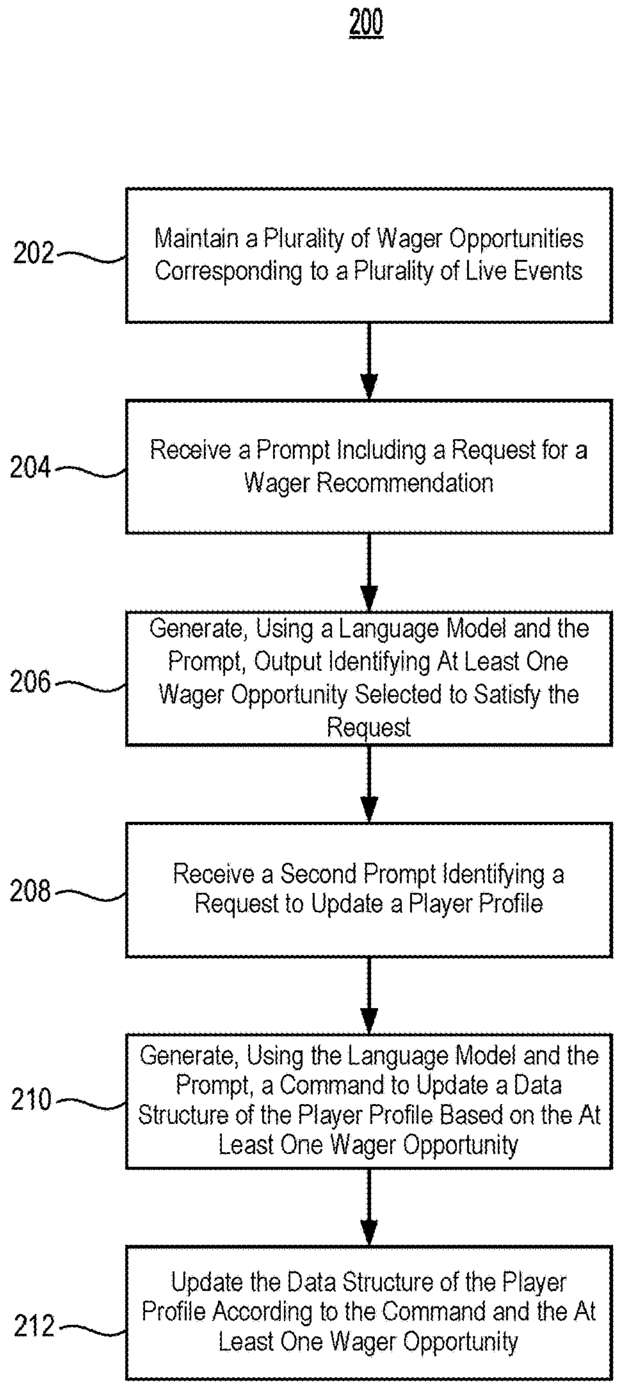
FIG. 2 illustrates an example flow diagram of a method for processing user profile data structures using language model output, in accordance with one or more implementations.

Referring now to FIG. 2, depicted is an illustrative flow diagram of a method 200 for processing user profile data structures using language model output. The method 200 can be executed, performed, or otherwise carried out by an interactive server or an interactive system. A data processing system (e.g., the data processing system 105) can be remote to one or more client systems (e.g., the client system 115) and one or more machine learning systems (e.g., the machine learning system 120) and can communicate with the one or more client systems or the one or more machine learning systems via a computer network (e.g., the network 110). In a brief overview of method 200, the interactive server or the interactive system can maintain a plurality of wager opportunities corresponding to a plurality of live events (STEP 202), receive a prompt including a request for a wager recommendation (STEP 204), generate, using a language model and the prompt, output identifying at least one wager opportunity selected to satisfy the request (STEP 206), receive a second prompt identifying a request to update a player profile (STEP 208), generate, using the language model and the second prompt, a command to update a data structure of the player profile based on the at least one wager opportunity (STEP 210), and update the data structure of the player profile according to the command and the at least one wager opportunity (STEP 212).

In further detail of method 200, the data processing system can maintain a plurality of wager opportunities (e.g., wager opportunities 160) corresponding to a plurality of live events (STEP 202). Each wager opportunity can correspond to a predefined wager type. The data processing system can generate and manage a collection of wager opportunities.

The wager opportunities can be directly tied to live events. Examples of wager opportunities can include Team A to win the game, Team B to win the game, total points scored over/under X points, Team A to win by X or more points, and Player C to score over X points, among others. Any type of wager opportunity can be maintained by the data processing system, which may involve storing and/or updating wager opportunities (or the odds thereof) in response to detected changes in one or more live events to which they correspond.

The data processing system can receive a prompt including a request for a wager recommendation (STEP 204). The prompt can specify a desired wager opportunity (e.g., Metro to win). In some implementations, the prompt can indicate an intent to place a wager on a specific wager opportunity. The data processing system can process the prompt in various formats, such as a simple text message or prompt from a user interface, a JSON or XML object including specific parameters or criteria for the wager recommendation, or a spoken request through a voice-enabled interface (which may be tokenized or converted into a machine-readable format), or combinations thereof. The prompt can include data points to allow the data processing system to identify the desired wager opportunity, for example, through a reference, such as directly mentioning the wager opportunity (e.g., I want to bet on Team A to win), or through contextual indicators, such as providing information about the live event or the type of wager desired (e.g., Give me a bet on the soccer game). Upon classifying the intent to request a wager opportunity, the data processing system can search and identify any number of wager opportunities maintained at step 202 to satisfy the request. Data of the wager opportunities can be converted or otherwise included in an input context for a language model, as described herein.

The data processing system can generate, using a language model and the prompt, output identifying at least one wager opportunity selected to satisfy the request (STEP 206). The prompt can specify desired sports, teams, or wager types. The data processing system can generate an input context for the language model based on the prompt. The language model can generate data structures corresponding to potential wager opportunities. The wager opportunities can include single wagers or parlays with one or multiple legs. The generated wager opportunities can include details such as sports, teams or participants, wager types, odds, and potential payout, among others. Based on the prompt, such as specifying a particular team or sport, the data processing system can generate wager opportunities using the language model.

In some implementations, the data processing system can generate and/or update a data structure (e.g., a data structure 170, sometimes referred to herein as the bet slip) based on the prompt and the wager opportunity selected. The data structure can be generated and/or updated if the intent of the prompt includes a request to both identify a wager recommendation and automatically add the wager opportunity to the data structure. The data structure be generated with fields and/or other that can store details such as the wager type, selections, odds, stake, potential payout, and a reference number. The data processing system can automatically populate the data structure with the aforementioned information by parsing the prompt and extracting relevant details, such as the desired wager opportunity and any specified wager amount. In some implementations, the data processing system can use the generated wager opportunity to fill in the specific selections, odds, and potential payout for the bet. The completed data structure can be stored in the storage, associated with the player profile, to track and manage the placed wager.

The data processing system can receive a second prompt identifying a request to update a player profile (STEP 208). As described herein, the player profile can be associated with the client system (also referred to herein as the client device). In some implementations, the data processing system can identify the player profile based on session data or account information. The second prompt can include a request to add a wager corresponding to at least one wager opportunity to the data structure. In some implementations, the data processing system can parse the prompt and/or the prompt in addition to other prompts/wager recommendations provided via the communication session to determine the intent of the prompt(s). In some implementations, the data processing system can infer the player's intent from the context of all prompts and messages/responses in the communication session.

In some implementations, the second prompt can include a wager amount corresponding to the wager. For example, the second prompt can include a wager amount (e.g., I want to bet $50 on Team A). In some implementations, the data processing system can identify keywords related to wager amounts (e.g., bet, stake, wager, etc.) and the numerical values associated with them. In some implementations, where the prompt is provided in a structured format, such as JSON or XML, the data processing system can directly extract the wager amount from a specific field or attribute. In some implementations, the data processing system can implement natural language processing techniques to identify named entities, such as numbers, identifiers, and/or other information stored within the prompt. In some implementations, the language model (e.g., language model 185) can be used to determine the intent of the prompt, as described herein.

The data processing system can generate, using the language model and the second prompt, a command to update a data structure of the player profile based on the at least one wager opportunity (STEP 210). As described herein, the language model can be trained on a dataset of previous player interactions, wager requests, and profile updates, among others. In this example, upon receiving the second prompt as input, the language model can parse the input context including the second prompt (and any other data described herein) and generate an output that includes a command for the data processing system to update the data structure associated with the player profile. In some implementations, the output generated by the language model can include an identifier of the player profile, an identifier of the wager opportunity to add to and/or update in the data structure, a wager amount to be included in the data structure for an identified wager opportunity, among other information that may be included in a command to update the data structure. In some implementations, the language model can generate a command that includes a token, character, string, or phrase that functions as a signal or identifier for the data processing system to execute the corresponding command/instructions. The language model can use a specific format or syntax for the generated command, such as JSON or a custom format. In some implementations, the generated command for the data processing system can include an identifier indicating the type of action to be performed (e.g., update wager in the data structure 170), the player ID (e.g., identifier for the player profile), the wager identifier (e.g., identifier for the specific wager being modified), the selected wager opportunity, the desired wager amount, and any other relevant details.

The data processing system can update the data structure of the player profile according to the command and the at least one wager opportunity (STEP 212). Upon receiving the command, the data processing system can execute the command to update the data structure associated with the player profile. For example, the data processing system can retrieve the profile using the player ID to identify the corresponding data structure, update the wager with the details specified in the command, update the wager status (e.g., to pending, active, settled, or voided, depending on the implementation), and determine the potential payout based on the wager amount and odds. In some implementations, if the data structure (e.g., bet slip) does not already exist for the player profile, the data processing system can generate and initialize a data structure to track the wager associated with the player profile. For example, after generating the data structure associated with the player profile, the data processing system can populate the corresponding data structure with the relevant information, such as the wager opportunity, wager amount, odds, and other relevant details. Any type of command can be generated by the language model and executed by the data processing system, including commands to update the data structure with previously deleted or removed wager opportunities (which may have been removed/deleted based on prior commands, etc.), among any other command described herein.

In some implementations, the data processing system can add a wager to the data structure associated with the player profile, for example, if the player is placing a first-time wager. In some implementations, the data processing system can remove an existing wager from the data structure. In some implementations, the data processing system can modify an existing wager by changing the wager amount, removing a leg from a parlay, or updating other relevant details. In some implementations, the data processing system can recalculate the potential payout based on the updated wager information. In some implementations, the data processing system can update the wager status to reflect the changes made (e.g., from pending to active, active to settled, or active to voided, etc.).

In some implementations, the data processing system can receive additional prompts identifying a request to modify the second wager stored in the data structure associated with the player profile. The data processing system can use the player profile and the specified wager information (e.g., reference numbers, identifiers, etc.) to identify the second wager in the data structure. The data processing system can process the third prompt to determine the desired modification. In this example, the third prompt corresponds to a request to change the amount of the second wager. In some implementations, the second wager can be a parlay wager, and the third prompt can correspond to a request to remove a leg of the parlay wager. In some implementations, where the data structure includes a plurality of wagers, the third prompt can correspond to a request to remove at least one wager from the wagers. The language model can generate a command for the data processing system to update the existing wager, as described herein. For example, the command can include the player ID, wager identifier or reference, updated wager amount, and other relevant details. The data processing system can execute the generated command to update the data structure.

In some implementations, the data processing system can provide a notification to the client system associated with the client device (e.g., a mobile application, a desktop application, etc.), notifying the player that their player profile has been updated. In some implementations, the data processing system can provide a notification, including an interactive element that, when interacted with, causes the data structure to be updated. The interactive element can correspond to a button, a link, or a touch area. The data processing system can send a notification to the player via the client system. The data processing system can receive an indication when the user interacts with the interactive element, such as by clicking a button. In some implementations, the notification can include a confirm button. Upon receiving an interaction with the confirm button, the data processing system can remove the wager, update the wager, or execute the specified wager. In some implementations, the notification can include an undo removal button, which, upon interaction, causes the data processing system to cancel the removal. In some implementations, upon receiving a wager placement request, the data processing system can generate a signal to execute the specific wagers indicated in the data structure. The signal can be a command, event, or other mechanism that triggers or causes the data processing system to execute the wagers.

Figure 3:
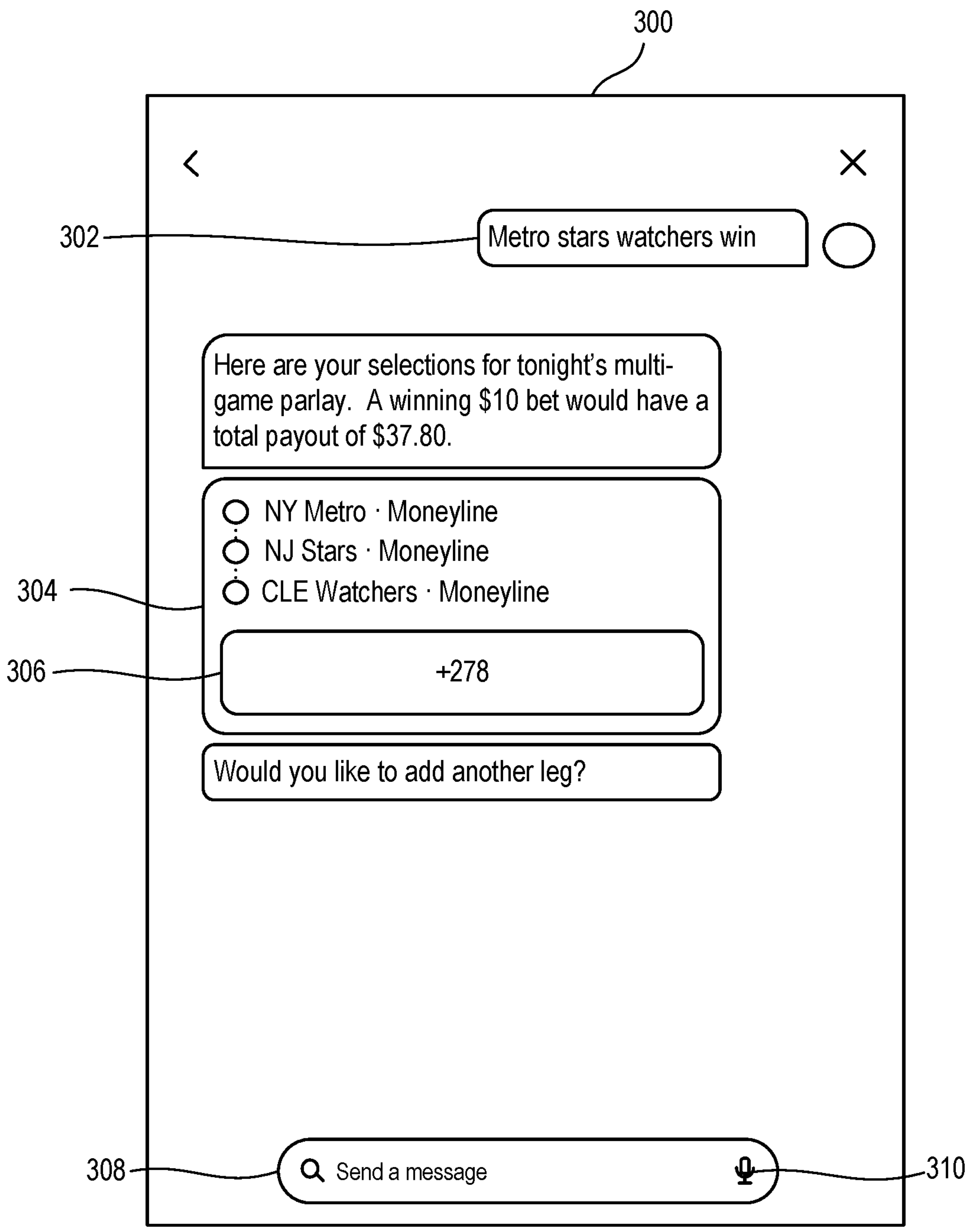
FIG. 3-4 illustrate an example implementation of an application interface, in accordance with one or more implementations.

Referring now to FIG. 3 in the context of the components described in connection with FIG. 1, depicted is an example implementation of an application interface, as described in connection with FIGS. 1-2. As shown, a graphical user interface 300 can display a prompt 302 based on a player's interaction with a message bar 308. The prompt 702 can be an initial prompt or search term entered by the player via the message bar 308. The message bar 308 can be used to input text or initiate voice commands for sending prompts 302. For example, players can type their message directly into the designated text box within the message bar 308, or they can use a microphone icon 310 to dictate their prompts. In this example, the prompt 302 reads "Metro stars watchers win", indicating the player's interest in a parlay bet involving different teams. The data processing system 105 can process the prompt 302 to determine the desired wager type and relevant teams. Based on the classification, the data processing system 105 can generate an input context for the language model 185.

The language model 185 can process the input context and generate formatting instructions corresponding to a specific wager, which in this case is a parlay. For example, the formatting instructions can include details about the wager, including the names of the teams, the wager types (e.g., moneyline), and the odds for the parlay. The client system 115 can parse the formatting instructions to extract relevant wager details. For example, as shown, the client system 115 can display, via the graphical user interface 300, a wager option 304, along with an additional output such as "Here are your selections for tonight's multi-game parlay. A winning $10 bet would have a total payout of $37.80". The wager option 704 can include the calculated odds 306 for the parlay. The odds 306 can indicate betting dynamics. For example, negative odds, such as −115, can indicate that the player is to wager $115 to win $100, and positive odds can indicate the potential winnings from a $100 wager.

Figure 4:
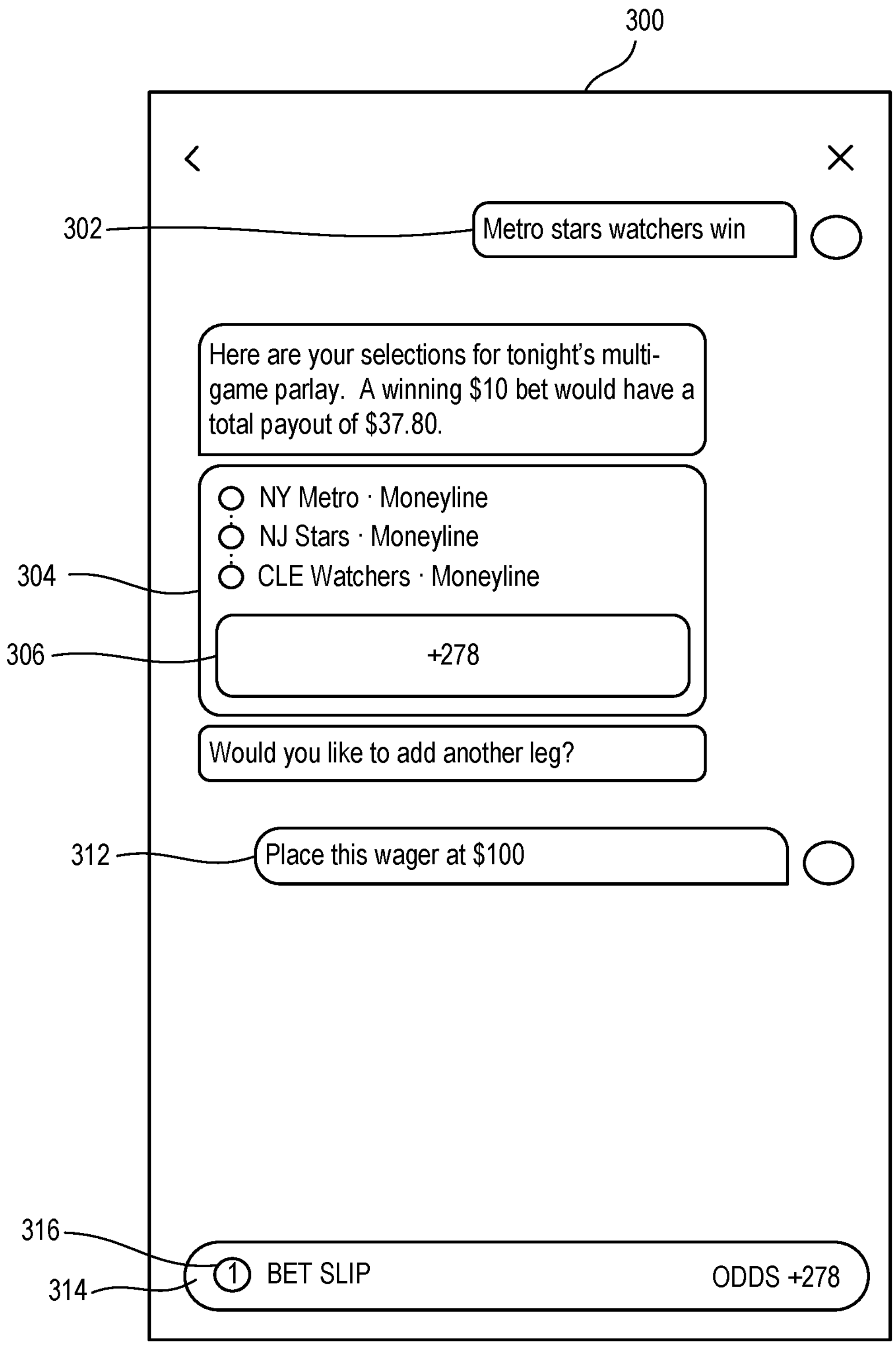

Referring now to FIG. 4, depicted is another example implementation of an application interface, as described in connection with FIG. 1-2. In this example, the language model receives a prompt 312 as an input. In this example, the prompt 312 reads "Place this wager at $100", which indicates a player's desire to include this wager in their existing or upcoming data structure 170 associated with the player profile 165. For example, the language model 185 can parse the prompt 312 to extract relevant details, such as command type (e.g., update wager), player ID, wager identifier, wager type (e.g., parlay, based on the session or the context of the prompt), selections (e.g., specific teams or outcomes such as Metro, Stars, and Watchers to win), wager amount (e.g., $100 as specified in the prompt), and other details. Based on the prompt 312 and the wager details, the language model 185 can generate a command for the data processing system 105 to update the data structure 170 associated with the player profile 165. In some implementations, the language model 185 can provide additional contextual information to the data processing system 105, such as details about the current betting session. Upon updating the data structure 170 associated with the player profile 165, the data processing system 105 can cause the client system 115 to update the graphical user interface 300 and present a bet slip indicator 314 to the player via the graphical user interface 300.

The bet slip indicator 314 can be an interactive element that, when interacted with, causes the graphical user interface 300 to update and toggle the visibility of the bet slip element. For example, the bet slip indicator 314 can expand or slide up to show its contents. In some implementations, the bet slip indicator 314 can slide in or out from the side of the graphical user interface 300 with a smooth animation. In some implementations, the bet slip indicator 314 can be displayed in a modal window. In some implementations, the bet slip indicator 314 can return to its initial position upon receiving an interaction. In some implementations, the bet slip indicator 314 can include a bet slip counter 316, for example, displayed in a circle or badge. The bet slip counter 316 can correspond to the number of wagers included in the bet slip 314. In some implementations, the bet slip counter 316 can be updated dynamically as wagers are added or removed from the bet slip indicator 314. For example, if a player removes a wager, the bet count counter 316 may decrease from "2" to "1", indicating the reduced number of bets on the slip. In this example, a bet count of "1" indicates that there is currently one wager on the bet slip indicator 314.

Figure 5:
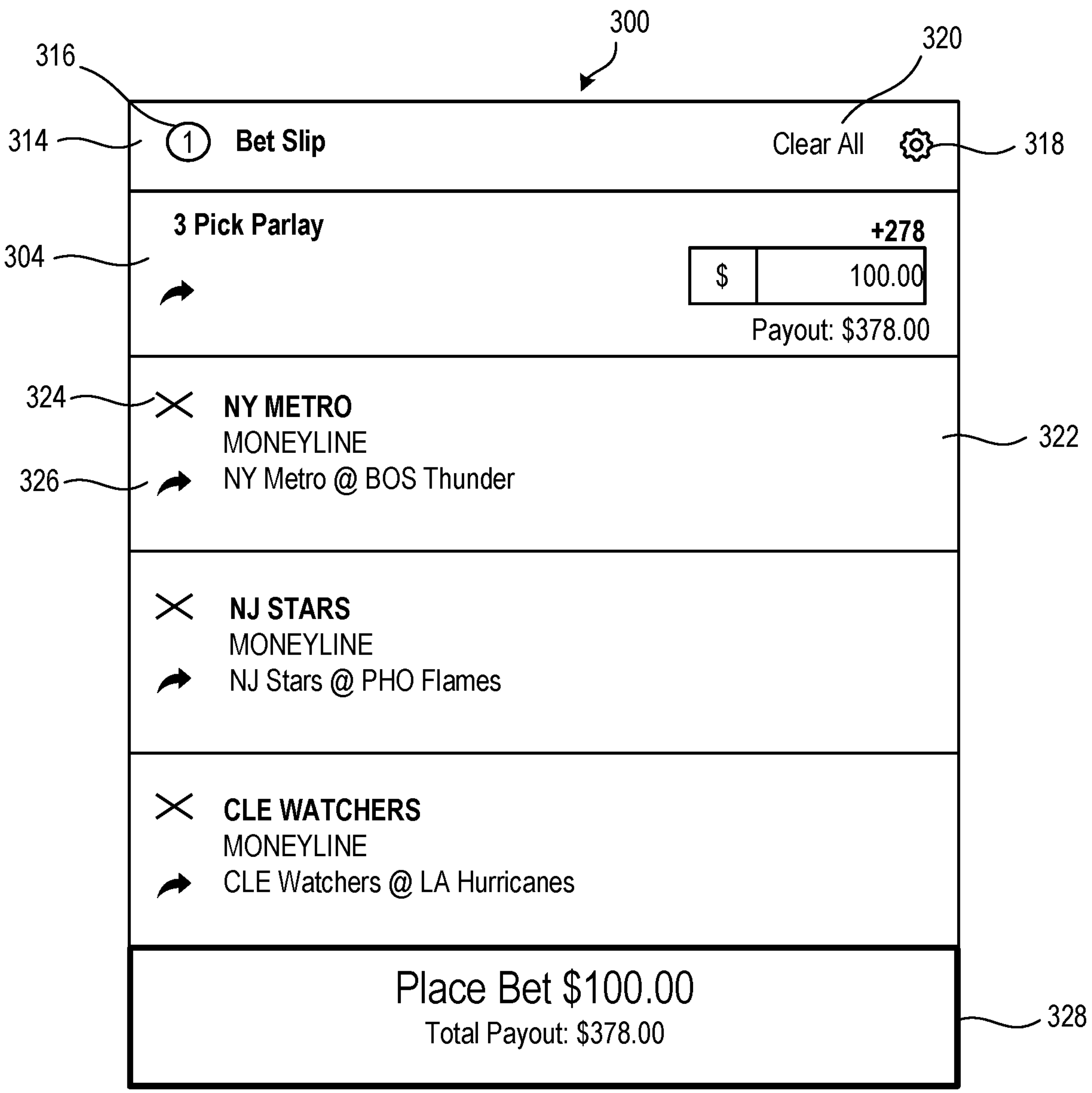
FIG. 5 illustrates an example implementation of a bet slip, in accordance with one or more implementations.

Referring now to FIG. 5, depicted is an example implementation of a betting slip indicator 314, as described in connection with FIG. 4. The bet slip indicator 314 can be a button or an icon that, when interacted with, causes the graphical user interface 300 to display the full details of the bet slip indicator 314. In some implementations, when the bet slip indicator 314 is interacted with (e.g., clicked), the graphical user interface 300 expands or slides out to display the full details of the bet slip indicator 314. The graphical user interface 300 can display the bet slip counter 316 to indicate the number of wagers currently included in the bet slip indicator 314. In some implementations, the player can view the wager option 304. In this example, the wager option 304 is a 3-Pick parlay, which includes three legs 322: NY Metro, NJ Stars, and CLE Watchers. In some implementations, the wager option 304 can display the associated odds, wager amount, total payout, and other relevant details. In some implementations, each leg 322 can be an interactive element that a player can interact with. As shown, each leg 322 can include a cross indicator 324 and an arrowhead indicator 326. The cross indicator 324, upon interaction, can cause the graphical user interface 300 to remove the associated leg 322 from the wager option 304. The arrowhead indicator 326 can cause the graphical user interface 300 to display the details of that particular leg 322. In some implementations, the arrowhead indicator 326 can cause the graphical user interface 300 to move or modify the associated leg 322 within the parlay.

In some implementations, the graphical user interface 300 can display a settings button 318. The settings button 318 can be an interactive element that, when interacted with, causes the graphical user interface 300 to display additional options or settings related to the bet slip, such as modifying the wager, canceling it, or viewing other details. In some implementations, the graphical user interface 300 can present a clear-all button 320, allowing players to clear all wagers from the bet slip. In some implementations, the graphical user interface 300 can provide a place bet button 328. The place bet button 328 can function as the primary action for confirming and placing a wager based on the selections made on the bet slip. The place bet button 328 can be bolded or styled to visually distinguish it from other elements on the graphical user interface 300. The place bet button 328 can display the total wager amount or other relevant information, such as the total payout. In some implementations, the place bet button 328 can initiate a confirmation prompt or notification upon interaction. For example, when a user interacts with the place bet button 328, such as by clicking or tapping on it, the data processing system 105 can cause the graphical user interface 300 to display a confirmation prompt or dialog to confirm the user's intent to place the wager. Upon receiving the confirmation, the data processing system 105 can execute the bet.

Figure 6:
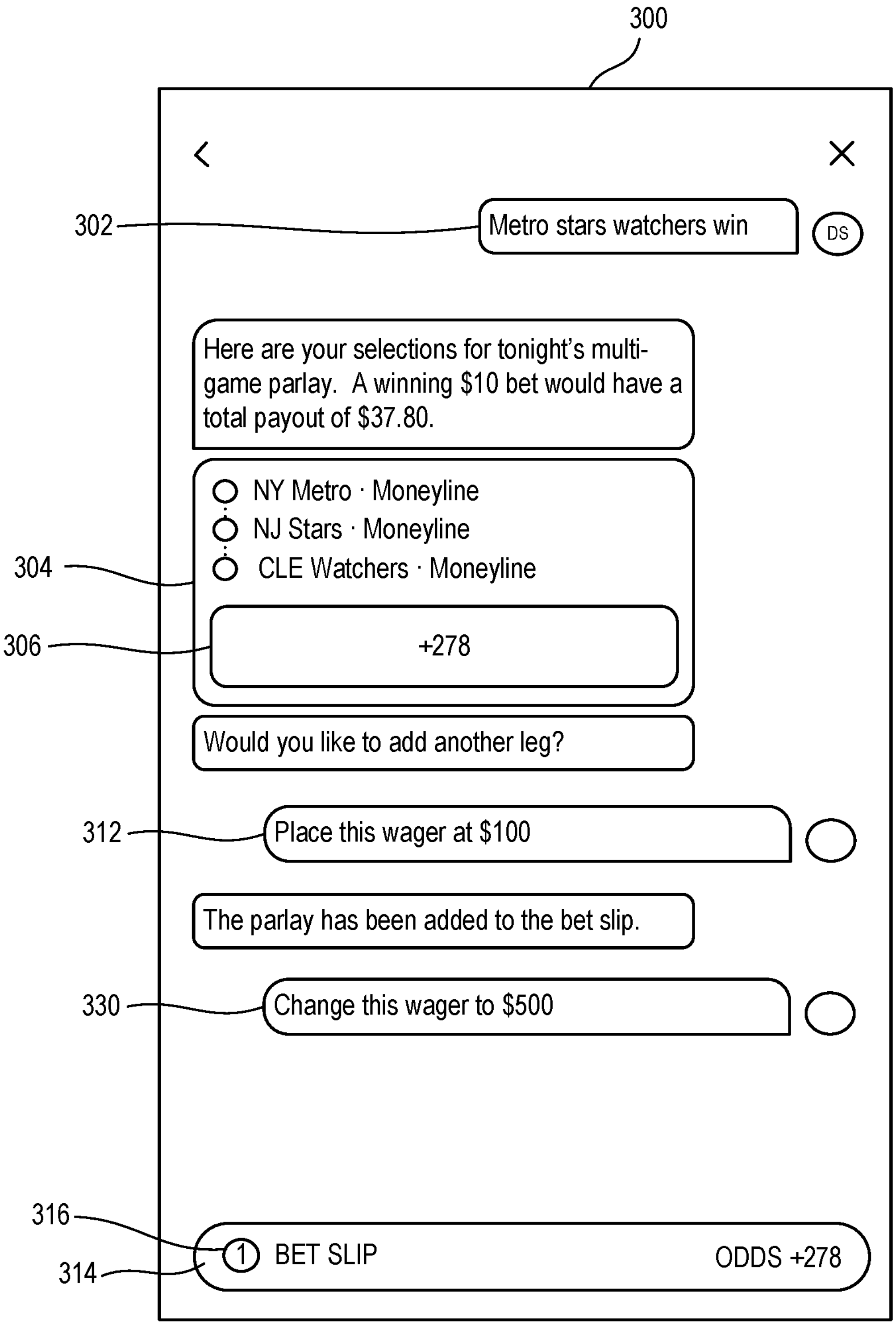
FIG. 6 illustrates another example implementation of an application interface, in accordance with one or more implementations.

Referring now to FIG. 6, depicted is another example implementation of an application interface, as described in connection with FIGS. 1-2. This example furthers the communication session described in connection with FIGS. 3-5. In this example, the language model receives an additional prompt 330 as an input. In this example, the prompt 330 reads "Change this wager to $500", which indicates a player's desire to the update an existing wager in the data structure 170 associated with the player profile 165. For example, the language model 185 can parse the prompt 330 to extract relevant details, such as command type (e.g., modify wager), player ID, wager identifier, wager type (e.g., parlay, based on the session or the context of the prompt), selections (e.g., specific teams or outcomes such as Metro, Stars, and Watchers to win), wager amount (e.g., $500 as specified in the prompt), and other details. Based on the prompt 330 and the wager details, the language model 185 can generate a command, including the relevant wager details, for the data processing system 105 to update the data structure associated with the player profile. In some implementations, the language model 185 can provide additional contextual information to the data processing system 105, such as details about the current betting session, such as an identifier of the wager opportunity to be modified. Upon updating the data structure associated with the player profile, the data processing system 105 can cause the client system 115 to update the graphical user interface 300 and present the updated bet slip indicator 314 to the player via the graphical user interface 300.

Figure 7:
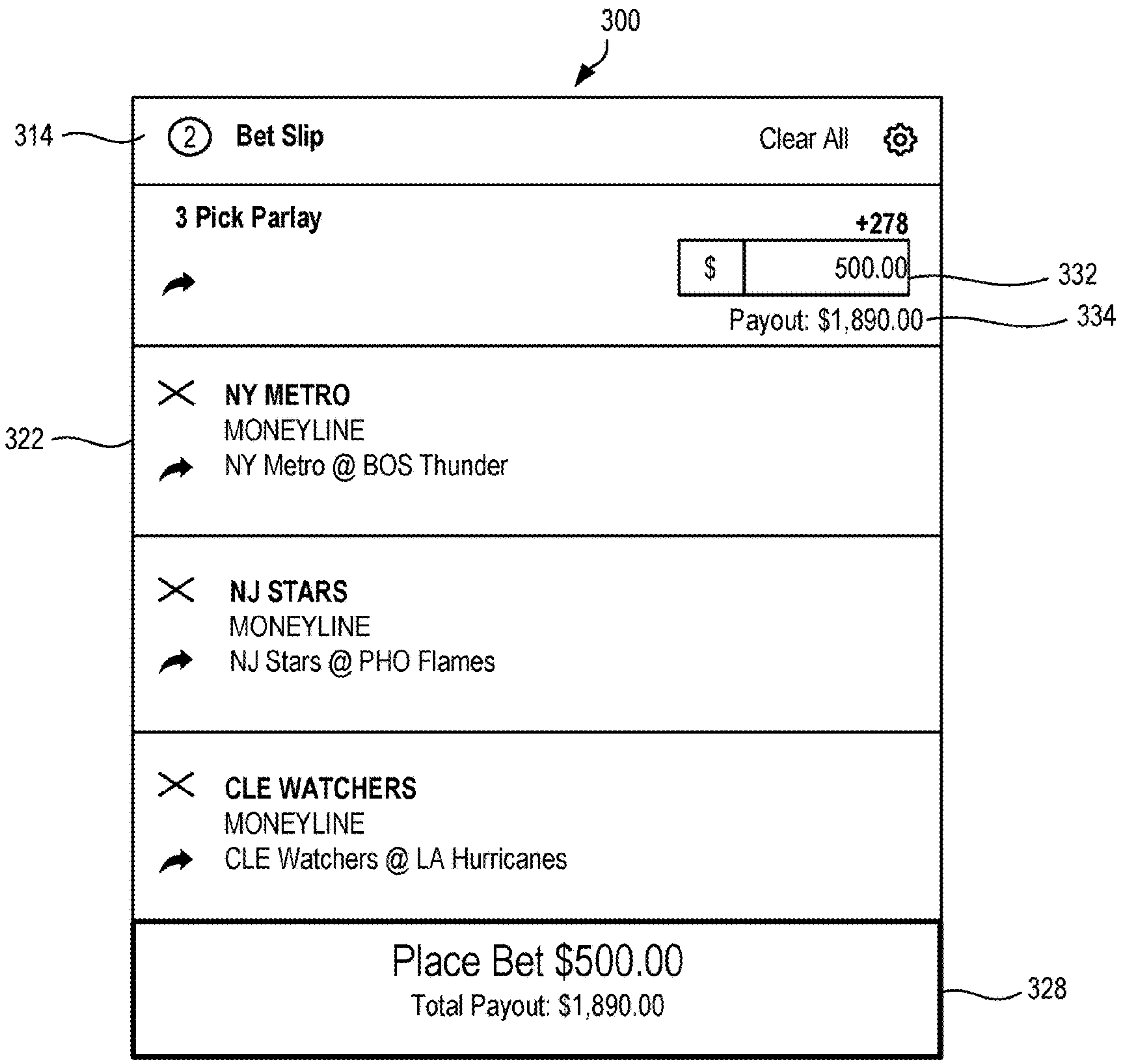
FIG. 7 illustrates another example implementation of a bet slip, in accordance with one or more implementations.

Referring now to FIG. 7, depicted is another example implementation of a betting slip indicator 314, as described in connection with FIG. 6. As shown, the wager option 304 displays the updated wager amount indicator 332 (e.g., $500) and the updated payout indicator 334 (e.g., $1,890) in response to updates to the player profile. In some implementations, the data processing system 105 can automatically update the wager amount indicator 332 and the total payout indicator 334. Similarly, the data processing system 105 can dynamically update the place bet button 328 to display the updated wager amount and total payout. As described herein, upon receiving an interaction with the place bet button 328, the data processing system 105 can execute the updated wager.

Figure 8:
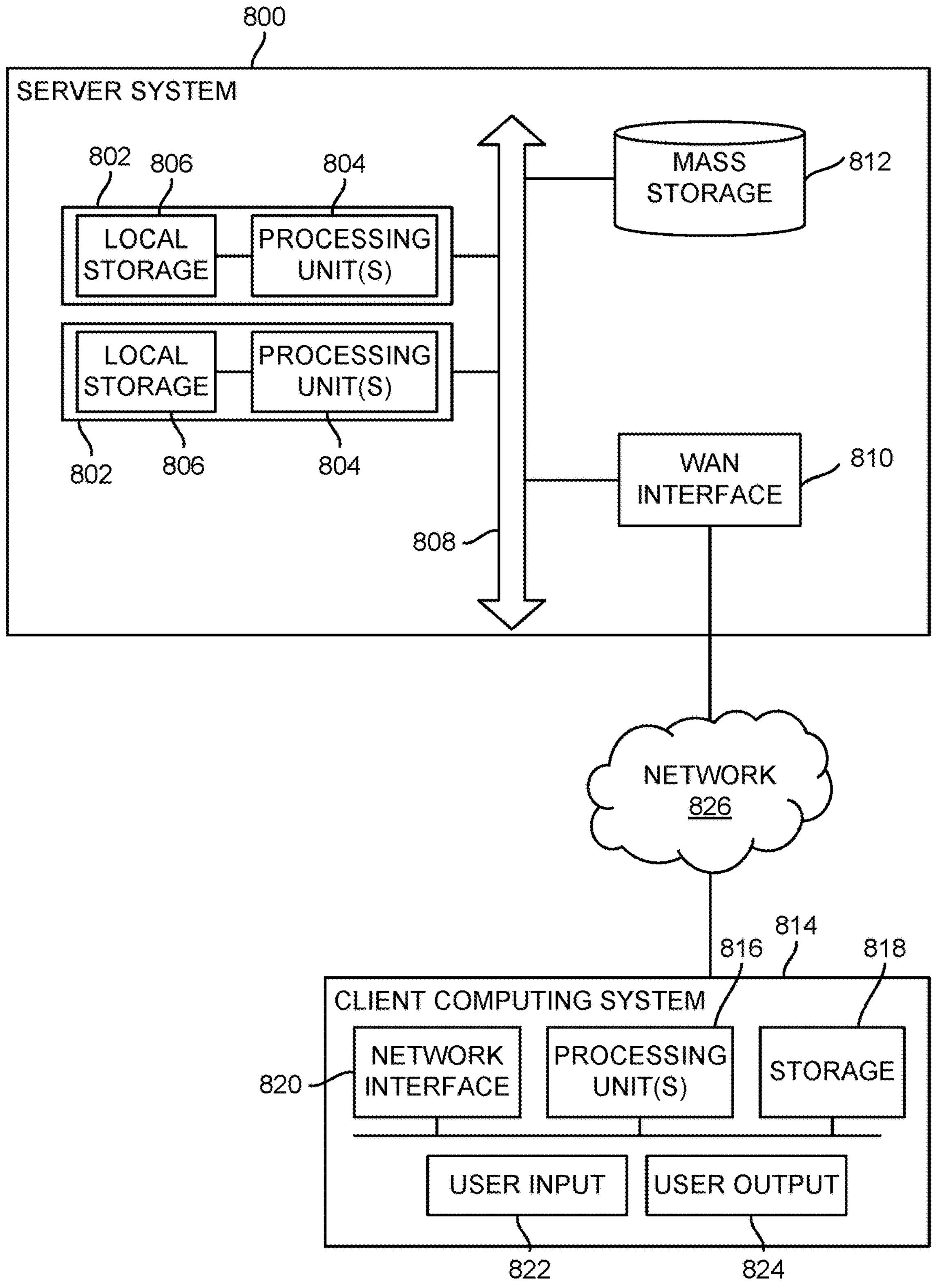
FIG. 8 illustrates a block diagram of a server system and a client computer system in accordance with an illustrative implementation.

Various operations described herein can be implemented on computer systems. FIG. 8 shows a simplified block diagram of a representative server system 800, client computer system 814, and network 826 usable to implement certain implementations of the present disclosure. In various implementations, server system 800 or similar systems can implement services or servers described herein or portions thereof. Client computer system 814 or similar systems can implement clients described herein. The system (e.g., the data processing system 105) and others described herein can be similar to the server system 800.

Server system 800 can have a modular design that incorporates a number of modules 802; while two modules 802 are shown, any number can be provided. Each module 802 can include processing unit(s) 804 and local storage 806.

Processing unit(s) 804 can include a single processor, which can have one or more cores, or multiple processors. In some implementations, processing unit(s) 804 can include a general-purpose primary processor as well as one or more special-purpose co-processors such as graphics processors, digital signal processors, or the like. In some implementations, some or all processing units 804 can be implemented using customized circuits, such as application specific integrated circuits (ASICs) or field programmable gate arrays (FPGAs). In some implementations, such integrated circuits execute instructions that are stored on the circuit itself. In other implementations, processing unit(s) 804 can execute instructions stored in local storage 806. Any type of processors in any combination can be included in processing unit(s) 804.

Local storage 806 can include volatile storage media (e.g., DRAM, SRAM, SDRAM, or the like) and/or non-volatile storage media (e.g., magnetic or optical disk, flash memory, or the like). Storage media incorporated in local storage 806 can be fixed, removable or upgradeable as desired. Local storage 806 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 804 need at runtime. The ROM can store static data and instructions that are needed by processing unit(s) 804. The permanent storage device can be a non-volatile read-and-write memory device that can store instructions and data even when module 802 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some implementations, local storage 806 can store one or more software programs to be executed by processing unit(s) 804, such as an operating system and/or programs implementing various server functions such as functions of the data processing systems 105 of FIG. 1 or any other system described herein, or any other server(s) associated with the data processing systems 105, or any other system described herein.

"Software" refers generally to sequences of instructions that, when executed by processing unit(s) 804 cause server system 800 (or portions thereof) to perform various operations, thus defining one or more specific machine implementations that execute and perform the operations of the software programs. The instructions can be stored as firmware residing in read-only memory and/or program code stored in non-volatile storage media that can be read into volatile working memory for execution by processing unit(s) 804. Software can be implemented as a single program or a collection of separate programs or program modules that interact as desired. From local storage 806 (or non-local storage described below), processing unit(s) 804 can retrieve program instructions to execute and data to process in order to execute various operations described above.

In some server systems 800, multiple modules 802 can be interconnected via a bus or other interconnect 808, forming a local area network that supports communication between modules 802 and other components of server system 800. Interconnect 808 can be implemented using various technologies including server racks, hubs, routers, etc.

A wide area network (WAN) interface 810 can provide data communication capability between the local area network (interconnect 808) and the network 826, such as the Internet. Technologies can be used, including wired (e.g., Ethernet, IEEE 802.3 standards) and/or wireless technologies (e.g., Wi-Fi, IEEE 802.8 standards).

In some implementations, local storage 806 is intended to provide working memory for processing unit(s) 804, providing fast access to programs and/or data to be processed while reducing traffic on interconnect 808. Storage for larger quantities of data can be provided on the local area network by one or more mass storage subsystems 812 that can be connected to interconnect 808. Mass storage subsystem 812 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 812. In some implementations, additional data storage resources may be accessible via WAN interface 810 (potentially with increased latency).

Server system 800 can operate in response to requests received via WAN interface 810. For example, one of modules 802 can implement a supervisory function and assign discrete tasks to other modules 802 in response to received requests. Work allocation techniques can be used. As requests are processed, results can be returned to the requester via WAN interface 810. Such operation can generally be automated. Further, in some implementations, WAN interface 810 can connect multiple server systems 800 to each other, providing scalable systems capable of managing high volumes of activity. Techniques for managing server systems and server farms (collections of server systems that cooperate) can be used, including dynamic resource allocation and reallocation.

Server system 800 can interact with various user-owned or user-operated devices via a wide-area network such as the Internet. An example of a user-operated device is shown in FIG. 8 as client computing system 814. Client computing system 814 can be implemented, for example, as a consumer device such as a smartphone, other mobile phone, tablet computer, wearable computing device (e.g., smart watch, eyeglasses), desktop computer, laptop computer, and so on.

For example, client computing system 814 can communicate via WAN interface 810. Client computing system 814 can include computer components such as processing unit(s) 816, storage device 818, network interface 820, user input device 822, and user output device 424. Client computing system 814 can be a computing device implemented in a variety of form factors, such as a desktop computer, laptop computer, tablet computer, smartphone, other mobile computing device, wearable computing device, or the like.

Processor 816 and storage device 818 can be similar to processing unit(s) 804 and local storage 806 described above. Suitable devices can be selected based on the demands to be placed on client computing system 814; for example, client computing system 814 can be implemented as a "thin" client with limited processing capability or as a high-powered computing device. Client computing system 814 can be provisioned with program code executable by processing unit(s) 816 to enable various interactions with server system 800 of a message management service such as accessing messages, performing actions on messages, and other interactions described above. Some client computing systems 814 can also interact with a messaging service independently of the message management service.

Network interface 820 can provide a connection to the network 826, such as a wide area network (e.g., the Internet) to which WAN interface 810 of server system 800 is also connected. In various implementations, network interface 820 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 822 can include any device (or devices) via which a user can provide signals to client computing system 814; client computing system 814 can interpret the signals as indicative of particular user requests or information. In various implementations, user input device 822 can include any or all of a keyboard, touch pad, touch screen, mouse or other pointing device, scroll wheel, click wheel, dial, button, switch, keypad, microphone, and so on.

User output device 824 can include any device via which client computing system 814 can provide information to a user. For example, user output device 824 can include a display to display images generated by or delivered to client computing system 814. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some implementations can include a device such as a touchscreen that function as both input and output device. In some implementations, other user output devices 824 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 804 and 816 can provide various functionality for server system 800 and client computing system 814, including any of the functionality described herein as being performed by a server or client, or other functionality associated with message management services.

It will be appreciated that server system 800 and client computing system 814 are illustrative and that variations and modifications are possible. Computer systems used in connection with implementations of the present disclosure can have other capabilities not specifically described here. Further, while server system 800 and client computing system 814 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, e.g., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of these. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The terms "data processing apparatus", "data processing system", "client device", "computing platform", "computing device", or "device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of these. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a player, implementations of the subject matter described in this specification can be implemented on a computer having a display device, e.g., a CRT (cathode ray tube), plasma, or LCD (liquid crystal display) monitor, for displaying information to the player and a keyboard and a pointing device, e.g., a mouse or a trackball, by which the player can provide input to the computer. Other kinds of devices can be used to provide for interaction with a player as well; for example, feedback provided to the player can include any form of sensory feedback, e.g., visual feedback, auditory feedback, or tactile feedback; and input from the player can be received in any form, including acoustic, speech, or tactile input. In addition, a computer can interact with a player by sending documents to and receiving documents from a device that is used by the player; for example, by sending web pages to a web browser on a player's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a player can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the interactive system described herein can include clients and servers. For example, the interactive system can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving input from a player interacting with the client device). Data generated at the client device (e.g., a result of an interaction, computation, or any other event or computation) can be received from the client device at the server, and vice-versa.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the interactive system could be a single module, a logic device having one or more processing modules, one or more servers, or part of a search engine.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations, elements, or acts of the systems and methods herein referred to in the singular may also embrace implementations including a plurality of these elements; and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for providing a system, the systems and methods described herein may be applied to other environments. The foregoing implementations are illustrative, rather than limiting, of the described systems and methods. The scope of the systems and methods described herein may thus be indicated by the appended claims, rather than the foregoing description, and changes that come within the meaning and range of equivalency of the claims are embraced therein.

What is claimed is:

1. A system, comprising:
- one or more processors coupled to non-transitory memory, the one or more processors configured to:
  - maintain a plurality of wager opportunities corresponding to a plurality of live events;
  - receive, from a client device, a first prompt including one or more first natural language text strings identifying a request for a wager recommendation;
  - generate, based on providing data corresponding to the first prompt as an input to a language model, output identifying at least one wager opportunity of the plurality of wager opportunities selected to satisfy the request;
  - receive, from the client device, a second prompt including one or more second natural language text strings identifying a request to update a player profile associated with the client device;
  - generate, based on providing data corresponding to the second prompt as an input to the language model, a command to update a data structure of the player profile based on the at least one wager opportunity; and
  - update the data structure of the player profile according to the command and the at least one wager opportunity.

2. The system of claim 1, wherein the second prompt comprises a request to add a wager corresponding to the at least one wager opportunity to the data structure.

3. The system of claim 2, wherein the second prompt comprises a wager amount corresponding to the wager, and wherein the one or more processors are further configured to:
- update the data structure of the player profile according to the command to include the wager amount for the wager.

4. The system of claim 1, wherein the data structure of the player profile stores a second wager, and wherein the one or more processors are further configured to:
- receive, from the client device, a third prompt identifying a request to modify the second wager stored in the data structure;
- generate, using the language model and the prompt, a second command to modify the second wager; and
- update the data structure of the player profile according to the second command.

5. The system of claim 4, wherein the third prompt identifies a change to an amount of the second wager.

6. The system of claim 4, wherein the second wager is a parlay wager, and wherein the third prompt identifies a request to remove a leg of the parlay wager.

7. The system of claim 1, wherein the data structure comprises a plurality of wagers, and wherein the one or more processors are further configured to:

receive, from the client device, a third prompt identifying a request to remove at least one wager of the plurality of wagers;

generate, using the language model and the prompt, a second command to update the data structure according to the third prompt; and update the data structure of the player profile according to the second command to remove the at least one wager.

8. The system of claim 7, wherein the one or more processors are further configured to:

provide a notification comprising an interactive element that, when interacted with, causes the data structure to be updated; and responsive to receiving an indication of an interaction with the interactive element, update the data structure of the player profile according to the second command to remove the at least one wager.

9. The system of claim 1, wherein the one or more processors are further configured to:

provide, to the client device, a notification indicating that the data structure of the player profile has been updated.

10. The system of claim 1, wherein the one or more processors are further configured to:

receive, from the client device, a request to place one or more wagers indicated in the data structure; and generate a signal to execute the one or more wagers indicated in the data structure.

11. A method, comprising:

maintaining, by one or more processors coupled to non-transitory memory, a plurality of wager opportunities corresponding to a plurality of live events;

receiving, by the one or more processors, from a client device, a first prompt including one or more first natural language text strings identifying a request for a wager recommendation;

generating, by the one or more processors, based on providing data corresponding to the first prompt as an input to a language model, output identifying at least one wager opportunity of the plurality of wager opportunities selected to satisfy the request;

receiving, by the one or more processors, from the client device, a second prompt including one or more second natural language text strings identifying a request to update a player profile associated with the client device;

generating, by the one or more processors, based on providing data corresponding to the second prompt as an input to the language model, a command to update a data structure of the player profile based on the at least one wager opportunity; and updating, by the one or more processors, the data structure of the player profile according to the command and the at least one wager opportunity.

12. The method of claim 11, wherein the second prompt comprises a request to add a wager corresponding to the at least one wager opportunity to the data structure.

13. The method of claim 12, wherein the second prompt comprises a wager amount corresponding to the wager, and further comprising:

updating, by the one or more processors, the data structure of the player profile according to the command to include the wager amount for the wager.

14. The method of claim 11, wherein the data structure of the player profile stores a second wager, and further comprising:

receiving, by the one or more processors, from the client device, a third prompt identifying a request to modify the second wager stored in the data structure;

generating, by the one or more processors, using the language model and the prompt, a second command to modify the second wager; and updating, by the one or more processors, the data structure of the player profile according to the second command.

15. The method of claim 14, wherein the third prompt identifies a change to an amount of the second wager.

16. The method of claim 14, wherein the second wager is a parlay wager, and wherein the third prompt identifies a request to remove a leg of the parlay wager.

17. The method of claim 11, wherein the data structure comprises a plurality of wagers, and further comprising:

receiving, by the one or more processors, from the client device, a third prompt identifying a request to remove at least one wager of the plurality of wagers;

generating, by the one or more processors, using the language model and the prompt, a second command to update the data structure according to the third prompt; and updating, by the one or more processors, the data structure of the player profile according to the second command to remove the at least one wager.

18. The method of claim 17, further comprising:

providing, by the one or more processors, a notification comprising an interactive element that, when interacted with, causes the data structure to be updated; and responsive to receiving an indication of an interaction with the interactive element, updating, by the one or more processors, the data structure of the player profile according to the second command to remove the at least one wager.

19. The method of claim 11, further comprising:

providing, by the one or more processors, to the client device, a notification indicating that the data structure of the player profile has been updated.

20. The method of claim 11, further comprising:

receiving, by the one or more processors, from the client device, a request to place one or more wagers indicated in the data structure; and generating, by the one or more processors, a signal to execute the one or more wagers indicated in the data structure.

* * * * *